US011332583B2

(12) United States Patent
Swier et al.

(10) Patent No.: US 11,332,583 B2
(45) Date of Patent: May 17, 2022

(54) POLYOLEFIN-POLYDIORGANOSILOXANE BLOCK COPOLYMER AND HYDROSILYLATION REACTION METHOD FOR THE SYNTHESIS THEREOF

(71) Applicants: Dow Silicones Corporation, Midland, MI (US); Dow Global Technologies LLC, Midland, MI (US)

(72) Inventors: Steven Swier, Midland, MI (US); Phillip Hustad, St. Paul, MN (US); David Devore, Midland, MI (US); Zachary Kean, Bay City, MI (US); Liam Spencer, Manvel, TX (US); Jordan Reddel, Midland, MI (US); Bethany Neilson, Manvel, TX (US); John Bernard Horstman, Midland, MI (US); Ken Kawamoto, Midland, MI (US); Jerzy Klosin, Midland, MI (US)

(73) Assignees: Dow Silicones Corporation, Midland, MI (US); Dow Global Technoloaies LLC, Midland, MI (US)

( * ) Notice: Subject to any disclaimer, the term of this patent is extended or adjusted under 35 U.S.C. 154(b) by 0 days.

(21) Appl. No.: 16/976,665

(22) PCT Filed: Feb. 22, 2019

(86) PCT No.: PCT/US2019/019084
§ 371 (c)(1),
(2) Date: Aug. 28, 2020

(87) PCT Pub. No.: WO2019/182721
PCT Pub. Date: Sep. 26, 2019

(65) Prior Publication Data
US 2021/0002431 A1 Jan. 7, 2021

Related U.S. Application Data

(60) Provisional application No. 62/644,838, filed on Mar. 19, 2018.

(51) Int. Cl.
*C08G 77/442* (2006.01)
(52) U.S. Cl.
CPC .................................. *C08G 77/442* (2013.01)
(58) Field of Classification Search
CPC .................................................. C08G 77/442
See application file for complete search history.

(56) References Cited

U.S. PATENT DOCUMENTS

| | | | |
|---|---|---|---|
| 2,676,182 A | 4/1954 | Daudt et al. | |
| 3,159,601 A | 12/1964 | Ashby | |
| 3,175,993 A | 3/1965 | Weyenberg | |
| 3,220,972 A | 11/1965 | Lamoreaux | |
| 3,296,291 A | 1/1967 | Chalk et al. | |
| 3,419,593 A | 12/1968 | Willing | |
| 3,516,946 A | 6/1970 | Modic | |
| 3,660,443 A | 5/1972 | Boissieras et al. | |
| 3,663,649 A | 5/1972 | Wheeler, Jr. | |
| 3,691,257 A | 9/1972 | Kendrick et al. | |
| 3,814,730 A | 6/1974 | Karstedt | |
| 3,989,668 A | 11/1976 | Lee et al. | |
| 4,370,358 A | 1/1983 | Hayes et al. | |
| 4,584,355 A | 4/1986 | Blizzard et al. | |
| 4,585,836 A | 4/1986 | Homan et al. | |
| 4,611,042 A | 9/1986 | Rivers-Farrell et al. | |
| 4,707,531 A | 11/1987 | Shirahata | |
| 4,766,176 A | 8/1988 | Lee et al. | |
| 4,774,310 A | 9/1988 | Butler | |
| 4,784,879 A | 11/1988 | Lee et al. | |
| 5,017,654 A | 5/1991 | Togashi et al. | |
| 5,036,117 A | 7/1991 | Chung et al. | |
| 5,175,325 A | 12/1992 | Brown et al. | |
| 5,310,843 A | 5/1994 | Morita | |
| 5,578,690 A * | 11/1996 | Marks ..................... | C08F 10/02 526/347 |
| 5,744,541 A * | 4/1998 | Sawaguchi .......... | C08G 81/024 524/588 |
| 5,854,356 A | 12/1998 | Schwindeman et al. | |
| 5,910,547 A | 6/1999 | Schwindeman et al. | |
| 6,005,051 A * | 12/1999 | Kennedy ............... | C08G 77/442 525/106 |
| 6,084,030 A | 7/2000 | Janssen et al. | |
| 6,127,502 A | 10/2000 | Krahnke et al. | |
| 6,175,031 B1 | 1/2001 | Tachikawa | |
| 6,258,891 B1 * | 7/2001 | Hoxmeier ............ | C08G 77/442 524/848 |
| 6,265,518 B1 | 7/2001 | Krahnke et al. | |

(Continued)

FOREIGN PATENT DOCUMENTS

| | | |
|---|---|---|
| EP | 0347895 | 12/1989 |
| EP | 1907495 | 4/2008 |

(Continued)

OTHER PUBLICATIONS

Ayandele, et al.; Polyhedral Oligomeric Silsesquioxane (POSS)-Containing Polymer Nanocomposites; Nanomaterials 2012; 2: 445.
Bulsari et al., Hydrosilylation of impact polypropylene co-polymer in a twin-screw extruder. Journal of Elastomers & Plastics vol. 40 Issue 4 pp. 365-380, 2008.
Ciolino, A. E., et al. (2004). "Synthesis of polybutadiene-graft-poly(dimethylsiloxane) and polyethylene-graft-poly (dimethylsiloxane) copolymers with hydrosilylation reactions." Journal of Polymer Science Part A: Polymer Chemistry 42(12): 2920-2930.
"Graiver., ""Graft and block copolymers with polysiloxane and vinyl polymersegments."" Silicon Chemistry. 2002, p. 107-120, vol. 1, No. 2. Norwell, Maine."
Inoue, et al. Reactions of Organozinc Coordination Compounds. Journal of Organometallic Chemistry, p. 11-16.
Long et al. Surface characteristics of hydro silylated polypropylene. Journal of Applied Polymer Science. vol. 88, Issue 14, pp. 3117-3131 2003.

(Continued)

*Primary Examiner* — Margaret G Moore
(74) *Attorney, Agent, or Firm* — Catherine U. Brown

(57) ABSTRACT

A polyolefin-polydiorganosiloxane block copolymer may be prepared by hydrosilylation reaction.

19 Claims, No Drawings

(56) References Cited

U.S. PATENT DOCUMENTS

| | | | |
|---|---|---|---|
| 6,583,237 B1* | 6/2003 | Imuta | C08F 10/00 526/89 |
| 6,624,254 B1 | 9/2003 | Arriola et al. | |
| 6,942,926 B2* | 9/2005 | Liu | C08G 77/442 428/447 |
| 7,087,686 B2 | 8/2006 | Britovsek et al. | |
| 7,355,089 B2 | 4/2008 | Chang et al. | |
| 7,858,706 B2 | 12/2010 | Arriola et al. | |
| 8,017,693 B2 | 9/2011 | Makio et al. | |
| 8,053,529 B2 | 11/2011 | Carnahan et al. | |
| 8,058,373 B2 | 11/2011 | Stevens et al. | |
| 8,088,869 B2 | 1/2012 | Joseph et al. | |
| 8,426,519 B2 | 4/2013 | Cogen et al. | |
| 8,476,375 B2 | 7/2013 | Backer et al. | |
| 8,501,885 B2 | 8/2013 | Arriola | |
| 8,501,894 B2 | 8/2013 | Crowther et al. | |
| 8,569,417 B2 | 10/2013 | Backer et al. | |
| 8,785,554 B2 | 7/2014 | Carnahan | |
| 8,835,548 B2 | 9/2014 | Esseghir et al. | |
| 8,859,709 B2 | 10/2014 | Katsoulis et al. | |
| 9,181,379 B2 | 11/2015 | Backer et al. | |
| 9,237,865 B2 | 1/2016 | Wang et al. | |
| 9,273,163 B2 | 3/2016 | Crowther et al. | |
| 9,388,265 B2 | 7/2016 | Burns et al. | |
| 9,441,079 B2* | 9/2016 | Yang | C08G 81/024 |
| 9,493,615 B2 | 11/2016 | Backer et al. | |
| 9,862,867 B2 | 1/2018 | Gordon et al. | |
| 2004/0209089 A1* | 10/2004 | Liu | H05K 3/285 428/447 |
| 2006/0199930 A1 | 9/2006 | Li Pi Shan et al. | |
| 2007/0167578 A1 | 7/2007 | Arriola et al. | |
| 2008/0311812 A1 | 12/2008 | Arriola et al. | |
| 2009/0042043 A1 | 2/2009 | Joseph et al. | |
| 2009/0156776 A1 | 6/2009 | Rubinsztajn et al. | |
| 2010/0181092 A1 | 7/2010 | Cree et al. | |
| 2010/0029705 A1 | 8/2010 | Lin et al. | |
| 2011/0172367 A1 | 7/2011 | Backer et al. | |
| 2012/0178867 A1* | 7/2012 | Esseghir | H01B 3/22 524/504 |
| 2012/0283388 A1 | 11/2012 | Backer et al. | |
| 2014/0161858 A1 | 6/2014 | Mays et al. | |
| 2015/0247007 A1* | 9/2015 | Yang | C08G 81/024 525/106 |
| 2015/0376482 A1 | 12/2015 | Bekemeier et al. | |
| 2016/0200909 A1 | 7/2016 | Chang et al. | |
| 2016/0376482 A1 | 12/2016 | Morgeneyer et al. | |
| 2017/0133121 A1 | 5/2017 | Yu et al. | |
| 2020/0157286 A1 | 5/2020 | Swier et al. | |
| 2020/0407512 A1* | 12/2020 | Swier | C08G 77/442 |
| 2021/0009880 A1* | 1/2021 | Swier | C09J 183/14 |
| 2021/0230372 A1* | 7/2021 | Swier | C08G 77/045 |

FOREIGN PATENT DOCUMENTS

| | | |
|---|---|---|
| JP | 03015444 | 3/2000 |
| WO | 9747665 | 12/1997 |
| WO | 9833842 | 8/1998 |
| WO | 20020081551 | 10/2002 |
| WO | 2003093349 | 11/2003 |
| WO | 2003093369 | 11/2003 |
| WO | 2005090426 | 9/2005 |
| WO | 2005090427 | 9/2005 |
| WO | 20070008765 | 1/2007 |
| WO | 2007035485 | 3/2007 |
| WO | 2009012215 | 1/2009 |
| WO | 20110032172 | 3/2011 |
| WO | 20110073047 | 7/2011 |
| WO | 2012103080 | 8/2012 |
| WO | 2014081682 | 5/2014 |
| WO | 2014105411 | 7/2014 |
| WO | 2015000851 | 1/2015 |
| WO | 2015017068 | 2/2015 |
| WO | 2017091720 | 6/2017 |
| WO | 2017173080 | 10/2017 |
| WO | 2019182718 | 9/2019 |
| WO | 2019182719 | 9/2019 |
| WO | 2019182720 | 9/2019 |
| WO | 2019182983 | 9/2019 |
| WO | 2019182986 | 9/2019 |
| WO | 2019182988 | 9/2019 |
| WO | 2019182992 | 9/2019 |
| WO | 2019182993 | 9/2019 |
| WO | 2020018159 | 1/2020 |

OTHER PUBLICATIONS

Louis., "Karstedt Catalyst-Catalyzed stepgrowthh co-polyaddition of 1, 9-decadiene and 1, 1, 3, 3,-tetramethyldisiloxane." Journal of Organometallic Chemistry. 2006, p. 2031-2036, vol. 691, No. 9. Elsevier, Amsterdam.

Malz, H. et al., Hydrosilylation of terminal Double Bonds. Polymer Engineering and Science, Dec. 1998, vol. 38, No. 12 p. 1976-1984.

"Niemczyk., ""Study of thermal properties of polyethylene and polypropylenenanocomposites with long alkyl chain-substituted POSS fillers."" J. Them Anal Calorim. 2016, p. 1287-1299".

Rubinsztajn, et al., Macromolecules 2005, 38:1061. "A New polycondensation process for the preparation of polysiloxane copolymers".

Rudin., "Modern Methods of Polymer Characterization." John Wiley & Sons. 1991, p. 103-112, New York.

Saam, J et al. Dow Corning. J. Am. Chem. Soc. (1961) 83(6) 1351.

Shearer et al., Free radical hydrosilylation of polypropylene. Journal of Applied Polymer Science. vol. 65, Issue 3, 439-447 (1997).

"Silicones", Apr. 15, 2003 (Apr. 15, 2003), Encyclopedia of Polymer Science and Techno, Wiley, US, pp. 765-841, XP007918236, pp. 801-805.

Spanos, et al., surface segregation, Macromolecules, 2003, 36 (2), pp. 368-372.

Tolinski, M.; Additives for Polyolefins 2015, chapter 7, p. 71.

Uozumi., "Synthesis of Functionalized Alternating Olefin Copolymer and Modificationto Graft Copolymer by Hydrosilylation." 2000, p. 923-1292.

Waddon., "Crystal Structure of Polyhedral OligomericSilsequioxane (POSS) Nano-materials: A Study by X-rayDiffraction and Electron Microscopy" 2003, p. 4555-4561, vol. 15.

Waddon., "Nanostructured Polyethylene-POSSCopolymers: Control of Crystallizationand Aggregation." 2002, p. 1149-1155, vol. 2, No. 10.

Zhang, H X, Et al., "Prepareation and properties of propylene/POSS copolymer with rac-Et (Ind) 2ZrXI2 catalyst", European Polymer Journal, Pergamon Press Ltd. Oxford, GB, vol. 45, No. 1, Jan. 1, 2009 (Jan. 1, 2009), pp. 40-46, XP025869132.

Zheng, et al.; Novel Polyolefin Nanocomposites; Macromolecules 2001; 34, 8034-8039.

Zhou, et al., "Palladium-Catalyzed Negishi Cross-Coupling Reactions of Unactivated Alkyl Iodides, Bromides, Chlorides, and Tosylates"; J. Am, Chem, Soc., vol. 125, No. 41, 2003, pp. 12627-12630.

* cited by examiner

POLYOLEFIN-POLYDIORGANOSILOXANE BLOCK COPOLYMER AND HYDROSILYLATION REACTION METHOD FOR THE SYNTHESIS THEREOF

CROSS REFERENCE TO RELATED APPLICATIONS

This application is a U.S. national stage filing under 35 U.S.C. § 371 of PCT Application No. PCT/US19/019084 filed on 22 Feb. 2019, which claims the benefit of U.S. Provisional Patent Application No. 62/644,838 filed 19 Mar. 2018 under 35 U.S.C. § 119 (e). PCT Application No. PCT/US19/019084 and U.S. Provisional Patent Application No. 62/644,838 are hereby incorporated by reference.

TECHNICAL FIELD

Polyolefin (A)—polyorganosiloxane (B) block copolymers and methods for the synthesis thereof are described herein. More particularly block copolymers with architectures polyolefin-polyorganosiloxane (AB), polyolefin-polyorganosiloxane-polyolefin (ABA), polyorganosiloxane-polyolefin-polyorganosiloxane (BAB), and copolymers comprising $(AB)_n$ architectures, where subscript n represents a number of repeating polyolefin-polyorganosiloxane segments, are described herein.

BACKGROUND

Block copolymers of polyolefins and polyorganosiloxanes have a range of applications owing to their combinations of properties from the block structure, including the ability to modify the surface of finished plastic parts for friction management, improved mar resistance and wear resistance, and as process aids to increase melt flow for cycle time reduction. Additionally, these block copolymers can be used as thermoplastic elastomers, particularly those with ABA triblock and $(AB)_n$ architectures.

Chain shuttling technology of The Dow Chemical Company provides a useful mechanism to form multiblock olefin block copolymers (OBCs) as well as OBCs with controlled block sequence distribution. In addition, chain shuttling technology can enable the synthesis of relatively exotic end-functional polyolefins. This technology involves polymerization of olefins in presence of a metal alkyl chain shuttling agent (CSA) such as diethyl zinc. If a large excess of the chain shuttling agent is utilized, the majority of chains initiated from the alkyl group from the CSA result in the majority of the chains functionalized by the CSA on one end while the other is bound to a metal cation. These polymeryl metals can either be further functionalized to produce a chain-end functional polyolefin derived at the metal cation chain end, or the complex can by hydrolyzed to leave a functional group on the opposite end, which was grown off of the CSA.

It is desirable to connect these silicon-containing functional groups to polyorganosiloxanes via a linking group. The linking group can be a symmetric chain end, an inert chain end, or a chain end bound to an orthogonally reactive functional group. The polyorganosiloxane and the polyolefin may be (mono)-end-functional or di-end-functional. Therefore, the resulting product can be a diblock (AB) polymer, a triblock (ABA or BAB) polymer, a multiblock $(AB)_n$ polymer, or a mixture thereof.

In previously reported attempts to react an Si—H functional polyorganosiloxane with an alkenyl-terminated polyolefin, the catalyst caused undesired isomerization of the double bond to an internal position, thus deactivating it to hydrosilylation and limiting conversion. This led to copolymers containing unreacted homopolymers, limiting their industrial applicability.

SUMMARY OF THE INVENTION

A polyolefin-polydiorganosiloxane block copolymer (copolymer) comprises unit formula:

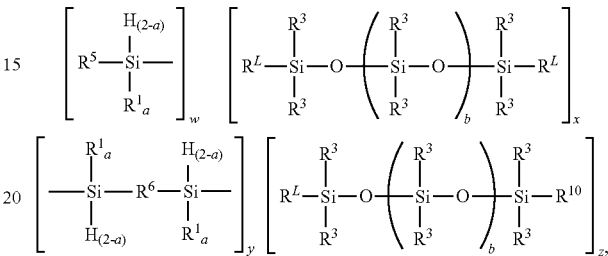

where each $R^L$ is an independently selected divalent hydrocarbyl group, each $R^1$ is an independently selected monovalent hydrocarbyl group, each $R^3$ is independently selected from a hydrogen atom and a monovalent hydrocarbyl group free of terminal aliphatic unsaturation, each $R^5$ is an independently selected hydrogen terminated polyolefin, each $R^6$ is an independently selected divalent polyolefin, each $R^{10}$ is independently selected from $R^3$ and an alkoxysilyl functional hydrocarbylene containing group, each subscript a is independently 1 or 2, each subscript b is independently 0 or a positive number; subscript w is 0 to 2, subscript x is 0 or a positive number, subscript y is 0 or a positive number, subscript z is 0 to 2, a quantity $(w+y)\geq 1$, a quantity $(x+z)\geq 1$, with the provisos that when subscript w=0, subscript z is >0 and when subscript z=0, subscript w>0.

A method for preparing the polyolefin-polydiorganosiloxane block copolymer comprises:
1) combining starting materials comprising:
  A) a polyolefin having 1 to 2 terminal silyl groups per molecule, where the terminal silyl group has formula

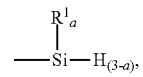

where each $R^1$ is an independently selected monovalent hydrocarbyl group and subscript a is 1 or 2 (silyl terminated polyolefin),
  B) a substantially linear polydiorganosiloxane having 1 to 2 terminal, silicon bonded, terminally aliphatically unsaturated, organic groups capable of undergoing hydrosilylation reaction; and
  C) a hydrosilylation reaction catalyst.

DETAILED DESCRIPTION OF THE INVENTION

The method for preparing the polyolefin-polydiorganosiloxane block copolymer comprises:
1) combining starting materials comprising:
  A) the polyolefin having 1 to 2 terminal silyl groups per molecule, B) the polydiorganosiloxane having 1 to 2 terminal organic groups with terminal aliphatic unsaturation, and C) the hydrosilylation reaction catalyst.

The starting materials may optionally further comprise one or more additional starting materials selected from the group consisting of D) a solvent, E) a hydrosilylation reaction inhibitor, F) an alkoxysilyl-functional organosilicon compound having at least one silicon bonded hydrogen atom, and a combination of two or more of D), E), and F).

Step 1) may be performed by any convenient means such as mixing at a temperature of 50° C. to 200° C., alternatively 100° C. to 120° C., at ambient pressure. Step 1) may be performed by any convenient means, such as solution processing (i.e., dissolving and/or dispersing the other starting materials in D) the solvent and heating) or melt extrusion (e.g., when solvent is not used or is removed during processing).

The method may optionally further comprise one or more additional steps. For example, the method may further comprise: 2) recovering the polyolefin-polydiorganosiloxane block copolymer after step 1). Recovering may be performed by any convenient means such as stripping and/or distillation to unwanted materials, e.g., catalyst, inhibitor, if used, by-products and/or unreacted starting materials. Alternatively, recovering may be performed by precipitation of the polyolefin-polydiorganosiloxane block copolymer in a non-solvent, thereby removing unwanted materials, optionally with water washing.

A) Silyl Terminated Polyolefin

Starting material A) is a polyolefin having 1 to 2 terminal silyl groups per molecule (silyl terminated polyolefin). The terminal silyl group has formula (A1):

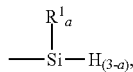

where each $R^1$ is an independently selected monovalent hydrocarbyl group and each subscript a is independently 1 or 2. Suitable monovalent hydrocarbyl groups for $R^1$ may have 1 to 20 carbon atoms, alternatively 1 to 12 carbon atoms, alternatively 1 to 8 carbon atoms, alternatively 1 to 4 carbon atoms, and alternatively 1 to 2 carbon atoms. Alternatively, the hydrocarbyl groups for $R^1$ may be selected from the group consisting of alkyl groups, alkenyl groups and aryl groups; alternatively alkyl and aryl; and alternatively alkyl. The alkyl groups are exemplified by methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbyl groups of 6 or more carbon atoms including cycloalkyl groups such as cyclopentyl and cyclohexyl. The alkenyl groups are exemplified by, but not limited to, vinyl, allyl, butenyl (including n-butenyl, iso-butenyl and t-butenyl), and hexenyl (including linear and branched isomers thereof). The aryl groups are exemplified by cyclopentadienyl, phenyl, tolyl, xylyl, anthracenyl, benzyl, 1-phenylethyl, 2-phenylethyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms.

Alternatively, each $R^1$ may be independently selected from the group consisting of alkyl and aryl, alternatively methyl and phenyl. Alternatively, each $R^1$ may be methyl.

Alternatively, the silyl terminated polyolefin may have unit formula (A2): $H_f[(R^{et})_t(R^O)_u]_g[$

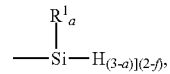

where subscript a and $R^1$ are as described above, subscript f is 0 to 1, subscripts t and u have relative values such that $0<t\leq1$, $0\leq u\leq1$, subscript g is 1 or more, each $R^{et}$ represents an ethylene unit, and each $R^O$ represents an olefin unit, other than ethylene. $R^O$ may be an alpha-olefin or a cyclic olefin. Examples of alpha-olefins are described below and include ethylene, propylene, and octene. Examples of cyclic olefins are described below and include ethylidenenorbornene, norbornene, vinyl norbornene, cyclohexene, and cyclopentene. Alternatively, subscript g may be 1 to 500, alternatively 10 to 400, and alternatively 18 to 360. Alternatively, subscript g may have a value sufficient to give the silyl terminated polyolefin a Mn of 500 to 50,000 g/mol, alternatively 500 to 10,000 g/mol.

Alternatively, the silyl terminated polyolefin may have unit formula (A3):

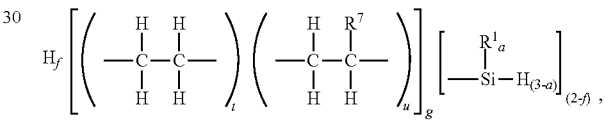

where subscripts a, f, g, t, and u, and $R^1$ are as described above. Each $R^7$ is independently a monovalent hydrocarbyl group of 2 to 20 carbon atoms. The monovalent hydrocarbyl group for $R^7$ may be alkyl, alkenyl or aryl; alternatively alkyl. Alternatively, $R^7$ may be an alkyl group of 2 to 12 carbon atoms, and alternatively 2 to 6 carbon atoms. Alternatively, each $R^7$ is a hexyl group.

Starting material A), the silyl terminated polyolefin, may have one terminal silyl group per molecule (i.e., where subscript f=1). Examples of this silyl-terminated polyolefin having a silyl group at one end of the polymer chain include dimethyl,hydrogensilyl-terminated polyethylene; dimethyl, hydrogensilyl-terminated poly(ethylene/octene) copolymer; methyl, dihydrogensilyl-terminated polyethylene; methyl, dihydrogensilyl-terminated poly(ethylene/octene) copolymer; diphenylhydrogensilyl-terminated polyethylene; diphenylhydrogensilyl-terminated poly(ethylene/octene) copolymer; phenyldihydrogensilyl-terminated polyethylene; phenyldihydrogensilyl-terminated poly(ethylene/octene) copolymer; chlorophenylhydrogensilyl-terminated polyethylene; or chlorophenylhydrogensilyl-terminated poly(ethylene/octene) copolymer. This silyl terminated polyolefin can be prepared by the process described in U.S. Patent Application Ser. No. 62/644,635, filed on Mar. 19, 2018 U.S. Patent Application Ser. No. 62/644,624, filed on Mar. 19, 2018, which are both hereby incorporated by reference.

The silyl terminated polyolefin having one terminal silyl group per molecule may be prepared by a process comprising: 1) combining starting materials comprising: a) a polymeryl-metal, optionally b) a nitrogen containing heterocycle, and c) a halosilane; thereby forming a product comprising the silyl-terminated polyolefin. The starting materials may optionally further comprise d) a solvent. The process may optionally further comprise one or more additional steps selected from: 2) washing the product with water, and 3) recovering the product. The a) polymeryl-metal may be prepared by a process comprising combining starting materials comprising: i) an olefin monomer, ii) a catalyst, and iii) a chain shuttling agent of formula $R^F{}_N M$, where M is a metal atom from group 1, 2, 12, or 13 of the Period Table of Elements, each $R^F$ is independently a monovalent hydrocarbyl group of 1 to 20 carbon atoms, and subscript N is 1 to the maximum valence of the metal selected for M. In certain embodiments, M may be a divalent metal, including but not limited to calcium (Ca), magnesium, and zinc (Zn), and in this embodiment subscript N=2. In certain embodiments, M may be a trivalent metal, including but not limited to aluminium (Al), boron (B), and gallium (Ga), and in this embodiment subscript N=3. Alternatively, M may be either Zn or Al; and alternatively Zn. The monovalent hydrocarbyl group of 1 to 20 carbon atoms may be alkyl group (as defined herein), alternatively exemplified by ethyl, propyl, octyl, and combinations thereof.

Suitable olefin monomers are disclosed for example, at col. 16, lines 5-36 of U.S. Pat. No. 7,858,706 and at col. 12, lines 7 to 41 of U.S. Pat. No. 8,053,529, which are hereby incorporated by reference. Examples of suitable olefin monomers include straight chain or branched alpha-olefins of 2 to 30 carbon atoms, alternatively 2 to 20 carbon atoms, such as ethylene, propylene, 1-butene, 3-methyl-1-butene, 1-pentene, 1-hexene, 4-methyl-1-pentene, 3-methyl-1-pentene, 1-octene, 1-decene, 1-dodecene, 1-tetradecene, 1-hexadecene, 1-octadecene, and 1-eicosene; cycloolefins of 3 to 30, alternatively 3 to 20 carbon atoms such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene. Alternatively, starting material i) may comprise ethylene and optionally one or more olefin monomers other than ethylene, such as propylene or 1-octene. Alternatively, the olefin monomer may be ethylene and 1-octene. Alternatively, the olefin monomer may be ethylene. Suitable catalysts (and optional cocatalysts) are disclosed, for example, at col. 19, line 45 to col. 51, line 29 of U.S. Pat. No. 7,858,706, and col. 16, line 37 to col. 48, line 17 of U.S. Pat. No. 8,053,529, which are hereby incorporated by reference. Suitable chain shuttling agents include trialkyl aluminium and dialkyl zinc compounds, such as triethylaluminium, tri(isopropyl)aluminium, tri(isobutyl)aluminium, tri(n-hexyl)aluminium, tri(n-octyl) aluminium, triethylgallium, and diethylzinc. Suitable chain shuttling agents are disclosed at col. 16, line 37 to col. 19, line 44 of U.S. Pat. No. 7,858,706 and col. 12, line 49 to col. 14, line 40 of U.S. Pat. No. 8,053,529, which are hereby incorporated by reference.

The polymeryl-metal useful for preparing the silyl terminated polyolefin may be prepared using known process conditions and equipment, such as those disclosed in U.S. Pat. No. 7,858,706 to Arriola, et al. at col. 52, line 2 to col. 57, line 21 and U.S. Pat. No. 8,053,529 to Carnahan, et al.

The optional nitrogen containing heterocycle may be added, for example, when the polymeryl-metal is a polymeryl-zinc and the halosilane is a chlorosilane. The optional nitrogen containing heterocycle may have a general formula selected from the group consisting of:

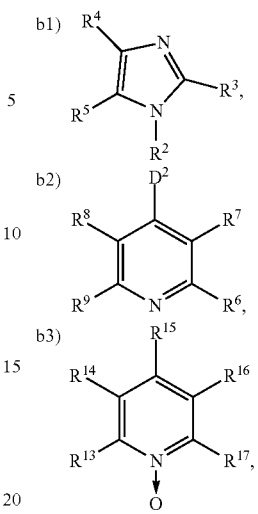

and mixtures of two or more of b1), b2), and b3), where in formulae b1), b2), and b3), where $R^2$ is a monovalent hydrocarbyl group, $R^3$ is a hydrogen atom or a monovalent hydrocarbyl group, $R^4$ is a hydrogen atom or a monovalent hydrocarbyl group, $R^5$ is a hydrogen atom or a monovalent hydrocarbyl group, $R^6$ is a hydrogen atom or a monovalent hydrocarbyl group, $R^7$ is a hydrogen atom or a monovalent hydrocarbyl group, $R^8$ is a hydrogen atom or a monovalent hydrocarbyl group, $R^9$ is a hydrogen atom or a monovalent hydrocarbyl group, and $D^2$ is an amino functional hydrocarbyl group or group of formula $-NR^{11}{}_2$, where each $R^{11}$ is a monovalent hydrocarbyl group, $R^{13}$ is a hydrogen atom or a monovalent hydrocarbyl group, $R^{14}$ is a hydrogen atom or a monovalent hydrocarbyl group, $R^{15}$ is a hydrogen atom or a monovalent hydrocarbyl group, $R^{16}$ is a hydrogen atom or a monovalent hydrocarbyl group, and $R^{17}$ is a hydrogen atom or a monovalent hydrocarbyl group. Suitable hydrocarbyl groups for $R^2$ to $R^9$ and $R^{13}$ to $R^{17}$ may have 1 to 12 carbon atoms, alternatively 1 to 8 carbon atoms, alternatively 1 to 4 carbon atoms, and alternatively 1 to 2 carbon atoms. Alternatively, the hydrocarbyl groups for $R^2$ to $R^9$ and $R^{13}$ to $R^{17}$ may be alkyl groups. The alkyl groups are exemplified by methyl, ethyl, propyl (including branched and linear isomers thereof), butyl (including branched and linear isomers thereof), and hexyl; alternatively methyl. Alternatively, each $R^3$ to $R^{10}$ may be selected from the group consisting of hydrogen and methyl. Alternatively, each $R^{13}$ to $R^{17}$ may be hydrogen. The nitrogen containing heterocycle used as the basic additive in the process may be selected from the group consisting of:

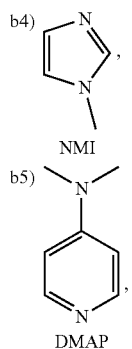

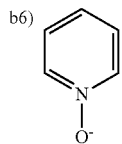

b6)

pyridine N-oxide, and mixtures of two or more of b4), b5), and b6).

When the nitrogen containing heterocycle is used, the resulting product may be recovered, e.g., by water washing to remove the nitrogen containing heterocycle before using the silyl-terminated polyolefin in the method for preparing the polyolefin-polydiorganosiloxane block copolymer described herein. Without wishing to be bound by theory, it is thought that presence of the nitrogen containing heterocycle may be detrimental to hydrosilylation reaction, therefore, removal by water washing may improve reactivity in the method to produce the polyolefin-polydiorganosiloxane block copolymer.

The halosilane may have formula $H_J R^{12}{}_K SiX_{(4-J-K)}$, where each $R^{12}$ is independently selected from hydrogen and a monovalent hydrocarbyl group of 1 to 18 carbon atoms, each X is independently a halogen atom, subscript J is 1 to 3, subscript K is 0 to 2, with the proviso that a quantity $(J+K) \leq 3$. Examples of suitable halosilanes include, but are not limited to: dihalosilanes such as methylhydrogendichlorosilane, methylhydrogendiiodosilane, methylhydrogenchloroiodosilane, ethylhydrogendichlorosilane, ethylhydrogendibromosilane, ethylhydrogendiiodosilane, ethylhydrogenchloroiodosilane, propylhydrogendichlorosilane, propylhydrogendibromosilane, propylhydrogendiiodosilane, propylhydrogenchloroiodosilane, phenylhydrogendichlorosilane, phenylhydrogendiiodosilane, phenylhydrogendibromosilane, and mixtures thereof. Examples of suitable halosilanes further include, but are not limited to: monohalosilanes such as dimethylhydrogenchlorosilane, dimethylhydrogenbromosilane, dimethylhydrogeniodosilane, diethylhydrogenchlorosilane, diethylhydrogeniodosilane, dipropylhydrogenchlorosilane, dipropylhydrogenbromosilane, dipropylhydrogeniodosilane, diphenylhydrogenchlorosilane, diphenylhydrogeniodosilane, diphenylhydrogenbromosilane, and mixtures thereof. Alternatively, the halosilane may be selected from the group consisting of c1) dimethylhydrogenchlorosilane, c2) diphenylhydrogenchlorosilane, c3) phenyldihydrogenchlorosilane, c4) phenylhydrogendichlorosilane, c5) dimethylhydrogeniodosilane, and mixtures of two or more of c1), c2), c3), c4), and c5).

Starting material (d) a solvent may optionally be used in step 1) of the process for making the silyl terminated polyolefin. The solvent may be a hydrocarbon solvent such as an aromatic solvent or an isoparaffinic hydrocarbon solvent. Suitable solvents include but are not limited to a non-polar aliphatic or aromatic hydrocarbon solvent selected from the group of pentane, hexane, heptane, octane, nonane, decane, undecane, dodecane, cyclopentane, methylcyclopentane, cyclohexane, methylcyclohexane, cycloheptane, cyclooctane, decalin, benzene, toluene, xylene, an isoparaffinic fluid including but not limited to Isopar™ E, Isopar™ G, Isopar™ H, Isopar™ L, Isopar™ M, a dearomatized fluid including but not limited to Exxsol™ D or isomers and mixtures of two or more thereof. Alternatively, the solvent may be toluene and/or Isopar™ E.

Alternatively, starting material A), the silyl terminated polyolefin, may have two silyl terminal groups per molecule (i.e., in formulae (A2) and (A3) where subscript f=0, the silyl terminated polyolefin is telechelic. Such telechelic silyl terminated polyolefins may be prepared by methods, such as those disclosed in U.S. Patent Application Ser. No. 62/644,808, filed on Mar. 19, 2018, which is hereby incorporated by reference.

Telechelic silyl terminated polyolefins may be prepared, for example, by a process comprising: 1) combining starting materials comprising a') a silicon-terminated organo-metal and c) the halosilane (as described above), thereby obtaining a product comprising the silyl-terminated polyolefin. In further embodiments, the starting materials of this process may further comprise b) the nitrogen containing heterocycle (as described above). The starting materials of this process may optionally further comprise d) the solvent (as described above).

The process may optionally further comprise one or more additional steps. For example, the process may further comprise: 2) recovering the telechelic silyl terminated polyolefin. Recovering may be performed by any suitable means, such as precipitation and filtration, optionally with water washing, thereby removing unwanted materials.

The amount of each starting material depends on various factors, including the specific selection of each starting material. However, in certain embodiments, a molar excess of starting material c) may be used per molar equivalent of starting material a'). For example, the amount of starting material c) may be 2 to 3 molar equivalents per molar equivalent of starting material a'). If starting material b) is used, the amount of starting material b) may be 2 molar equivalents per molar equivalent of starting material a').

The amount of d) solvent will depend on various factors, including the selection of starting materials a'), c), and, if present, b). However, the amount of d) solvent may be 65% to 95% based on combined weights of all starting materials used in step 1).

Starting material a') may be a silicon-terminated organo-metal having the formula (II) or (III):

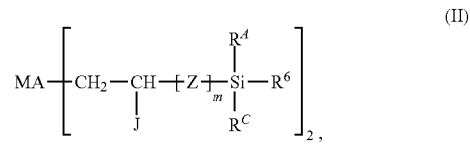

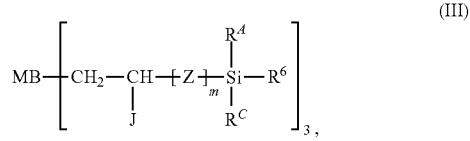

where

MA is a divalent metal selected from the group consisting of Zn, Mg, and Ca;

MB is a trivalent metal selected from the group consisting of Al, B, and Ga;

each Z is an independently selected divalent hydrocarbyl group of 1 to 20 carbon atoms;

subscript m is a number from 1 to 100,000;

each J is independently a hydrogen atom or a monovalent hydrocarbyl group of 1 to 20 carbon atoms;

each $R^A$, $R^B$, and $R^C$ is independently selected from the group consisting of a hydrogen atom, a monovalent hydrocarbyl group of 1 to 10 carbon atoms, a vinyl group, an alkoxy group, or one or more siloxy units selected from M, D, and T units:

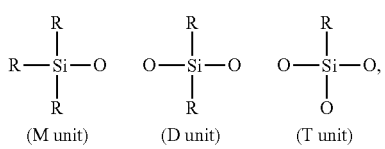

(M unit)  (D unit)  (T unit)

wherein each R is independently a hydrogen atom, a monovalent hydrocarbyl group of 1 to 10 carbon atoms, or cyclic, a vinyl group, or an alkoxy group;

two or all three of $R^A$, $R^B$, and $R^C$ may optionally be bonded together to form a ring structure when two or all three of $R^A$, $R^B$, and $R^C$ are each independently one or more siloxy units selected from D and T units.

In certain embodiments, subscript m of formulas (II) and (III) is a number from 1 to 75,000, from 1 to 50,000, from 1 to 25,000, from 1 to 10,000, from 1 to 5,000, from 1 to 2,500, and/or from 1 to 1,000.

In certain embodiments of formula (II), MA is Zn. In certain embodiments of formula (III), MB is Al. In further embodiments of formula (II), J is an ethyl group. In further embodiments of formula (III), J is a hydrogen atom.

Prior to this process, the silicon-terminated organo-metal may be prepared according to the disclosures of U.S. Patent Application No. 62/644,654 and 62/644,664 both filed on Mar. 19, 2018, which are both hereby incorporated by reference.

For example, in certain embodiments, the silicon-terminated organo-metal may be prepared by a process comprising combining starting materials comprising: (a) a vinyl-terminated silicon-based compound, (b) a chain shuttling agent, (c) a procatalyst, (d) an activator, (e) an optional solvent, and (f) an optional scavenger, thereby obtaining a product comprising the silicon-terminated organo-metal.

Alternatively, the silicon terminated organo-metal may be prepared by a process comprising combining starting materials at an elevated temperature, the starting materials comprising: (a) the vinyl-terminated silicon-based compound, (b) the chain shuttling agent, and optionally (e) the solvent. This process may be conducted at a temperature of 60° C. to 200° C., alternatively 80° C. to 180° C., and alternatively 100° C. to 150° C. This process may be conducted for a duration of from 30 minutes to 200 hours.

In certain embodiments, (a) the vinyl-terminated silicon-based compound may have the formula (IV):

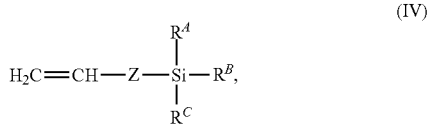

where Z, $R^A$, $R^B$, and $R^C$ are as described above.

In certain embodiments, (b) the chain shuttling agent may have formula $R^F_N M$, where $R^F$, M and subscript N are as described above.

In certain embodiments, (c) the procatalyst may be any compound or combination of compounds capable of, when combined with an activator, polymerization of unsaturated monomers. Suitable procatalysts include but are not limited to those disclosed in WO 2005/090426, WO 2005/090427, WO 2007/035485, WO 2009/012215, WO 2014/105411, WO 2017/173080, U.S. Patent Publication Nos. 2006/0199930, 2007/0167578, 2008/0311812, and U.S. Pat. Nos. 7,355,089 B2, 8,058,373 B2, and 8,785,554 B2. The nitrogen containing heterocycle and the halosilane are as described above for starting materials b) and c) used to make the silyl terminated polyolefin having one terminal silyl group per molecule.

In certain embodiments, the (d) activator may be any compound or combination of compounds capable of activating a procatalyst to form an active catalyst composition or system. Suitable activators include but are not limited to Brønsted acids, Lewis acids, carbocationic species, or any activator known in the art, including but limited to those disclosed in WO 2005/090427 and U.S. Pat. No. 8,501,885 B2. In exemplary embodiments, the co-catalyst is [($C_{16-18}H_{33-37})_2CH_3NH$] tetrakis(pentafluorophenyl)borate salt.

In certain embodiments, the (e) optional solvent may be any solvent disclosed above as starting material (d) or as described below.

In further embodiments, the silicon-terminated organo-metal prepared by the processes described above may be followed by a subsequent polymerization step. Specifically, the silicon-terminated organo-metal prepared by the processes as described above may be combined with at least one olefin monomer, a procatalyst as defined herein, an activator as defined herein, and optional materials, such as solvents and/or scavengers, under polymerization process conditions known in the art, including but not limited to those disclosed in U.S. Pat. Nos. 7,858,706 and 8,053,529. Such a polymerization step essentially increases the subscript n in the formula (I) and the subscript m in formulas (II) and (III). Examples of suitable olefin monomers for use in the polymerization step are as described above.

As described below, the silicon-terminated organo-metal may also be prepared by combining starting materials comprising 6-bromo-1-hexene, THF, and chlorodimethylsilane ($Me_2HSiCl$) to form hex-5-en-1-yldimethylsilane, followed by combining hex-5-en-1-yldimethylsilane, triethylborane, a borane-dimethylsulfide complex, and diethyl zinc to form the silicon terminated organo-metal.

Alternatively, the silicon-terminated organo-metal may be prepared in a batch reactor using a process as described below in Reference Example 10, by varying appropriate starting materials, i.e., the olefin monomers, catalysts, chain shuttling agents, catalysts, procatalysts, activators, and solvents, suitable examples of which are described herein. Step 1) of combining the starting materials may be performed by any suitable means, such as mixing at a temperature of 50° C. to 200° C., alternatively 100° C. to 120° C., at ambient pressure. Heating may be performed under inert, dry conditions. In certain embodiments, step 1) of combining the starting materials may be performed for a duration of 30 minutes to 20 hours, alternatively 1 hour to 10 hours. In further embodiments, step 1) of combining the starting materials may be performed by solution processing (i.e., dissolving and/or dispersing the starting materials in (d) solvent and heating) or melt extrusion (e.g., when (d) solvent is not used or is removed during processing).

The silicon-terminated organo-metal prepared as described above for starting material (a') may then be combined with (c) the halosilane, and optionally (b) the nitrogen containing heterocycle, and/or (d) the solvent, which are as described above thereby producing the telechelic silyl terminated polyolefin.

Alternatively, the silyl terminated polyolefin suitable for use as starting material A) may be prepared in a solution polymerization process, wherein the polyolefin polymer is made by a method comprising: a) combining i) the olefin monomer, ii) the catalyst, and the iii) chain shuttling agent described above to prepare iv) a polymeryl metal; b) combining iv) the polymeryl-metal, v) a halosilane, and optionally v) a nitrogen containing heterocycle; where steps a) and b) are performed in a solution. In the solution, the resulting silyl terminated polyolefin may comprise 10% to 20% of the total weight of the reaction mixture. The balance typically comprises unreacted olefin monomer and an unreactive solvent. Commercial processes are typically done in a continuous reactor, where fresh olefin monomer and catalyst are continuously fed to reach a steady state conversion to polyolefin, and the polyolefin is removed at a rate commensurate with these feeds and the conversion to polyolefin. In these systems, the olefin monomer is not completely converted to polyolefin. For example, in the case of a copolymerization of ethylene and an alpha-olefin, the effluent from the reactor typically contains unreacted monomers, 10% of the ethylene and >50% of the alpha-olefin. After polymerization, the solvent and unreacted monomers may be removed by a devolatilization process to leave solid silyl terminated polyolefin. After devolatilization of the silyl terminated polyolefin, the starting materials comprising the silyl terminated polyolefin, the polydiorganosiloxane, and the catalyst may be combined in step 1) of the method described above for making the polyolefin-polydiorganosiloxane block copolymer.

Starting material A) may be one silyl terminated polyolefins or may comprise two or more silyl terminated polyolefins differing in at least one of the following properties: structure, viscosity, average molecular weight, olefin blocks, and sequence. Alternatively, starting material A) may comprise a mixture of silyl terminated polyolefins, wherein both the silyl terminated polyolefin having one terminal silyl group per molecule mono-terminated silyl terminated polyolefin) and the telechelic silyl terminated polyolefin are used in the mixture for starting material A).

The amount of starting material A) used in step 1) of the method for making the copolymer described herein will depend on various factors including whether a mixture of mono-terminated silyl terminated polyolefin and telechelic silyl terminated polyolefin is used, the desired architecture of the polyolefin-polydiorganosiloxane block copolymer to be formed, and the selection of starting material B), however, the amount of starting material A) may be 5% to 95% based on combined weights of all starting materials combined in step 1). Alternatively, the amount of starting material A) may be 10% to 60%, and alternatively 10% to 40%, on the same basis.

B) Polydiorganosiloxane

In the method for making the copolymer, starting material B) is a polydiorganosiloxane having 1 to 2 terminal silicon bonded terminally aliphatically unsaturated organic groups capable of undergoing hydrosilylation reaction. The polydiorganosiloxane is substantially linear, alternatively is linear.

Starting material B) may comprise a polydiorganosiloxane of formula (B1):

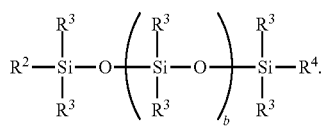

In formula (B1), each $R^2$ is an independently selected monovalent organic group having terminal aliphatic unsaturation. Each $R^3$ is independently a hydrogen atom or a monovalent organic group free of terminal aliphatic unsaturation. Each $R^4$ is independently selected from $R^2$ and $R^3$. Subscript b may be 0 or a positive number. Alternatively, subscript b has an average value of at least 2. Alternatively subscript b may be 2 to 2000. Alternatively, subscript b may be 10 to 1,000. Alternatively, subscript b may be 30 to 500.

The groups having terminal aliphatic unsaturation for $R^2$ may be alkenyl, which is exemplified by, but not limited to, vinyl, allyl, butenyl (including n-butenyl, iso-butenyl and t-butenyl), and hexenyl (including linear and branched isomers thereof). Alternatively, the groups having terminal aliphatic unsaturation for $R^2$ may be alkynyl groups exemplified by, but not limited to, ethynyl, propynyl, and butynyl (including branched and linear isomers thereof). Alternatively, each $R^2$ may be an alkenyl group. Alternatively, each $R^2$ may be selected from the group consisting of vinyl, allyl, and hexenyl. Alternatively, each $R^2$ may be vinyl or allyl. Alternatively, each $R^2$ may be vinyl.

Suitable monovalent organic groups for $R^3$ include monovalent hydrocarbyl groups and monovalent halogenated hydrocarbyl groups. Examples of monovalent hydrocarbyl groups include, but are not limited to, alkyl such as those described above for $R^1$ and aryl such as those described above for $R^1$. Examples of monovalent halogenated hydrocarbon groups include, but are not limited to, chlorinated alkyl groups such as chloromethyl and chloropropyl groups; fluorinated alkyl groups such as fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5, 4,4,3,3-nonafluorohexyl, and 8,8,8,7,7-pentafluorooctyl; chlorinated cycloalkyl groups such as 2,2-dichlorocyclopropyl, 2,3-dichlorocyclopentyl; and fluorinated cycloalkyl groups such as 2,2-difluorocyclopropyl, 2,3-difluorocyclobutyl, 3,4-difluorocyclohexyl, and 3,4-difluoro-5-methylcycloheptyl. Examples of other monovalent organic groups include, but are not limited to, hydrocarbyl groups substituted with oxygen atoms such as glycidoxyalkyl, and hydrocarbon groups substituted with nitrogen atoms such as aminoalkyl and cyano-functional groups such as cyanoethyl and cyanopropyl. Alternatively, each $R^3$ is a monovalent hydrocarbyl group exemplified by alkyl and aryl, alternatively methyl and phenyl.

In one embodiment, each $R^4$ is an $R^3$ group, as described above. Alternatively, each $R^4$ is an $R^2$ group, as described above. Alternatively, a mixture of polydiorganosiloxanes may be used as starting material B), wherein some instances of $R^4$ are $R^3$ and other instances of $R^4$ are $R^2$. Starting material B) may be one polydiorganosiloxane or may comprise two or more polyorganosiloxanes differing in at least one of the following properties: structure, viscosity, average molecular weight, siloxane units, and sequence.

Starting material B) may comprise a polydiorganosiloxane such as i) α,ω-dimethylvinylsiloxy-terminated, polydimethylsiloxane;

ii) α-dimethylvinylsiloxy-terminated, ω-trimethylsiloxy-terminated, polydimethylsiloxane;

iii) α,ω-dimethylvinylsiloxy-terminated poly(dimethylsiloxane/methylphenylsiloxane);

iv) α-dimethylvinylsiloxy-terminated, ω-trimethylsiloxy-terminated, poly(dimethylsiloxane/methylphenylsiloxane);

v) α,ω-(phenyl,methyl,vinyl-siloxy)-terminated, polydimethylsiloxane;

vi) α,ω-dimethylhexenylsiloxy-terminated polydimethylsiloxane;

vii) α-dimethylhexenylsiloxy-terminated, ω-trimethylsiloxy-terminated, polydimethylsiloxane;

viii) a combination of two or more of i), ii), iii), iv), v), vi), and vii).

Methods of preparing polydiorganosiloxanes suitable for use as starting material B), such as hydrolysis and condensation of the corresponding organohalosilanes or equilibration of cyclic polydiorganosiloxanes, are well known in the art.

The amount of starting material B) used in step 1) of the method described herein will depend on various factors including whether a mixture of mono-terminated and telechelic polydiorganosiloxanes is used, the desired architecture of the polyolefin-polydiorganosiloxane block copolymer to be formed, and the selection of starting materials A) and B), however, the amount of starting material B) may be 5% to 95% based on combined weights of all starting materials combined in step 1). Alternatively, the amount of starting material B) may be 10% to 60%, and alternatively 10% to 40%, on the same basis.

C) Catalyst

In the method for making the copolymer, starting material C) is a hydrosilylation reaction catalyst. Hydrosilylation reaction catalysts include platinum group metal catalysts, which are known in the art and are commercially available. Such hydrosilylation catalysts can be a metal selected from platinum, rhodium, ruthenium, palladium, osmium, and iridium. Alternatively, the hydrosilylation catalyst may be a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum (Karstedt's Catalyst). These complexes may be microencapsulated in a resin matrix. Alternatively, a hydrosilylation catalyst may comprise 1,3-diethenyl-1,1,3,3-tetramethyldisiloxane complex with platinum. Exemplary hydrosilylation catalysts are described in U.S. Pat. Nos. 3,159,601; 3,220,972; 3,296,291; 3,419,593; 3,516,946; 3,814,730; 3,989,668; 4,784,879; 5,036,117; and 5,175,325; and EP 0 347 895 B. Microencapsulated hydrosilylation catalysts and methods of preparing them are known in the art, as exemplified in U.S. Pat. Nos. 4,766,176 and 5,017,654.

The amount of catalyst used in step 1) of the method described herein will depend on various factors including the selection of starting materials A) and B) and their respective contents of silicon bonded hydrogen atoms and terminally aliphatically unsaturated groups, whether an inhibitor is present, and the temperature during step 1), however, the amount of catalyst is sufficient to catalyze hydrosilylation reaction of starting materials comprising A) and B), alternatively the amount of catalyst is sufficient to provide 1 ppm to 1000 ppm of the platinum group metal based on combined weights of all starting materials combined in step 1), alternatively 5 ppm to 100 ppm, on the same basis.

D) Solvent

Starting material D) may optionally be added during the method for making the copolymer described above. The solvent may be an organic solvent, exemplified by a) an alcohol such as methanol, ethanol, isopropanol, butanol, or n-propanol; b) a ketone such as acetone, methylethyl ketone, or methyl isobutyl ketone; c) an aromatic hydrocarbon such as benzene, toluene, or xylene; d) an aliphatic hydrocarbon such as heptane, hexane, or octane; e) a glycol ether such as propylene glycol methyl ether, dipropylene glycol methyl ether, propylene glycol n-butyl ether, propylene glycol n-propyl ether, or ethylene glycol n-butyl ether, f) a halogenated hydrocarbon such as dichloromethane, 1,1,1-trichloroethane or methylene chloride; g) chloroform; h) dimethyl sulfoxide; i) dimethyl formamide; j) acetonitrile; k) tetrahydrofuran; l) white spirits; m) mineral spirits; n) naphtha, o) an isoparaffin such as Isopar™ E commercially available from ExxonMobil Chemical Company; or a combination of two or more of a), b), c), d), e), f), g), h), i), j), k), l), m), n), and o).

The amount of solvent will depend on various factors including the type of solvent selected and the amount and type of other starting materials selected for use in step 1) of the method for making the polyolefin-polydiorganosiloxane block copolymer described herein. However, when present, the amount of solvent may range from 1% to 99%, alternatively 2% to 50%, based on combined weights of all starting materials combined in step 1). The solvent can be added during combining the starting materials comprising A), B), and C), for example, to aid mixing and delivery. Alternatively, one or more of the starting materials may be dissolved in the solvent before combining with the other starting materials in step 1) of the method described herein.

E) Inhibitor

Starting material E) an inhibitor may be added in step 1) of the method described above for altering the reaction rate of the starting materials, as compared to a reaction containing the same starting materials but with the inhibitor omitted. Inhibitors for hydrosilylation reactions are exemplified by (E1) acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-diemthyl-1-hexyn-3-ol, and 1-ethynyl-1-cyclohexanol, and a combination of two or more thereof; (E2) cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination of two or more thereof; (E3) ene-yne compounds such as 3-methyl-3-penten-1-yne, 3,5-dimethyl-3-hexen-1-yne, and a combination of two or more thereof; (E4) triazoles such as benzotriazole; (E5) phosphines; (E6) mercaptans; (E7) hydrazines; (E7) amines, such as tetramethyl ethylenediamine; (E8) fumarates such as dialkyl fumarates, dialkenyl fumarates, dialkoxyalkyl fumarates, and a combination of two or more thereof; (E9) maleates such as diallyl maleate; (E10) nitriles; (E11) ethers; (E12) carbon monoxide; (E13) alcohols such as benzyl alcohol; (E14) a silylated acetylenic compound; and a combination of two or more of (E1) to (E14).

The silylated acetylenic compound may be used to reduce or minimize coloring (yellowing) of the reaction product produced in step 1), as compared to a reaction product that does not contain a silylated acetylenic compound or that contains an organic acetylenic alcohol, such as those described above. The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy) dimethylphenylsilane, (3-phenyl-1-butyn-3-oxy) dimethylvinylsilane, (3-phenyl-1-butyn-3-oxy) dimethylhexenylsilane, (cyclohexyl-1-ethyn-1-oxy) dimethylhexenylsilane, (cyclohexyl-1-ethyn-1-oxy) dimethylvinylsilane, (cyclohexyl-1-ethyn-1-oxy) diphenylmethylsilane, (cyclohexyl-1-ethyn-1-oxy) trimethylsilane, and combinations thereof. Alternatively, the inhibitor is exemplified by methyl(tris(1,1-dimethyl-2-propynyloxy))silane, ((1,1-dimethyl-2-propynyl)oxy)trimethylsilane, or a combination thereof. The silylated acetylenic compound useful as inhibitor may be prepared by methods known in the art, such as silylating an acetylenic alcohol described above by reacting it with a chlorosilane in the presence of an acid receptor.

The amount of inhibitor added to the starting materials will depend on various factors including the desired pot life of the starting materials, the temperature selected for step 1), the particular inhibitor used, and the selection and amounts other starting materials used. However, when present, the amount of inhibitor may range from >0% to 1%, alternatively >0% to 5%, alternatively 0.001% to 1%, alternatively 0.01% to 0.5%, and alternatively 0.0025% to 0.025%, based on combined weights of all starting materials.

Starting Material F) Alkoxysilyl-Functional Organosilicon Compound

Starting material F) is an alkoxysilyl-functional organosilicon compound having at least one silicon bonded hydrogen atom. Examples of suitable alkoxysilyl-functional organosilicon compounds are exemplified by alkoxy-functional organohydrogensiloxane oligomers of unit formula (F1):

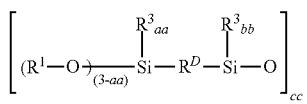

$(HR^3_2SiO_{1/2})_{dd}(R^3_3SiO_{1/2})_{ee}(HR^3SiO_{2/2})_{ff}(R^3_2SiO_{2/2})_{gg}(R^3SiO_{3/2})_{hh}(HSiO_{3/2})_{ii}(SiO_{4/2})_{jj}$, where $R^1$ and $R^3$ are as described above; each subscript aa is independently 0, 1, or 2; alternatively 0 or 1; each subscript bb is independently 0, 1, or 2; subscript cc>0; each $R^D$ is independently a divalent hydrocarbyl group of 2 to 18 carbon atoms; subscript dd≥0, subscript ee has a value such that 5≥ee≥0, subscript ff≥0, subscript gg≥0, subscript hh>0, subscript ii≥0, and subscript jj≥0, and a quantity (cc+dd+ee+ff+gg+hh+ii+jj)≤50. Suitable divalent hydrocarbyl groups for $R^D$ are exemplified by an alkylene group such as ethylene, propylene, butylene, or hexylene; an arylene group such as phenylene, or an alkylarylene group such as:

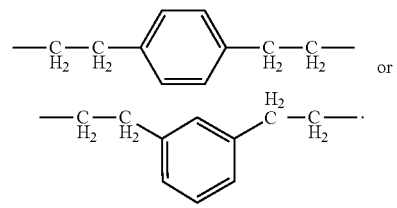

Alternatively, each $R^D$ is a group of formula $-C_2H_4-$. Examples of such alkoxy-functional organohydrogensiloxane oligomers may be prepared by the methods in U.S. Pat. No. 3,175,993 to Weyenberg and co-pending U.S. Provisional Patent Application Ser. Nos. 62/524,636, 62/524,637, and 62/524,639, all of which were filed on 26 Jun. 2017, and all of which are hereby incorporated by reference.

Alternatively, starting material F) may have formula (F2):

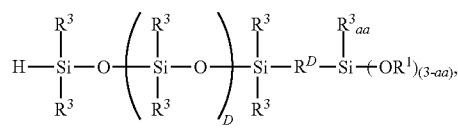

where $R^1$ $R^3$, $R^D$, and subscript aa are as described above, and subscript D is 0 to 20, alternatively 1 to 10.

Alternatively, starting material F) may have formula (F3):

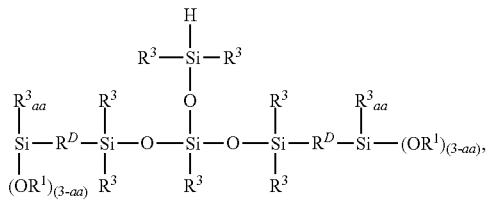

where $R^1$ $R^3$, $R^D$, and subscript aa are as described above.

Alternatively, starting material F) may comprise formula (F4), (F5), or both, where formula (F4) is

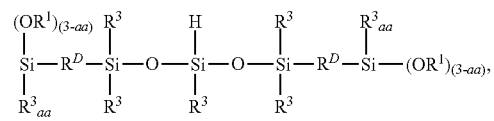

and formula (F5) is

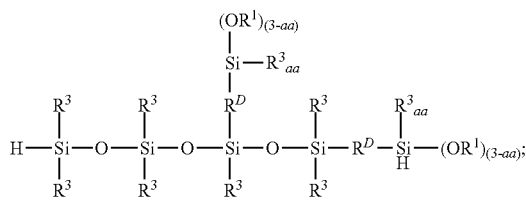

where $R^1$ $R^3$, $R^D$, and subscript aa are as described above.

Alternatively, starting material F) may have unit formula (F6): $(R^3_2SiO_{212})_E(R^3HSiO_{212})_F$

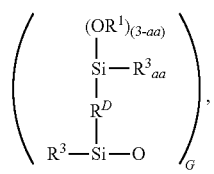

where $R^1$, $R^3$, $R^D$, and subscript aa are as described above, subscript E is 0 or more, subscript F is 1 or more, and subscript G is 1 or more and $4 \leq (E+F+G) \leq 50$.

In unit formula (I) for the polyolefin-polydiorganosiloxane block copolymer described herein, group $R^{10}$ forms as a hydrosilylation reaction product of the silicon bonded hydrogen atom of starting material F) and a terminally aliphatically unsaturated organic group of starting material B). When starting material F) is included, starting material B) comprises a telechelic polydiorganosiloxane. The amounts of starting materials B) and F) may be selected such that up to 1.05 molar equivalent of starting material F) to 1 molar equivalent of terminally aliphatically unsaturated groups in the telechelic polydiorganosiloxane for starting material B) is present (F:B molar ratio). Alternatively, F:B molar ratio may be 1.05:1 to 1:1, for example, when a triblock copolymer with BAB architecture will be formed. In one embodiment, starting materials A), B), C), and F) may be combined concurrently in step 1). Alternatively, starting materials A), B) and C) may be combined in amounts such that one aliphatically unsaturated group per molecule from starting material B) at a terminus of the polyolefin-polydiorganosiloxane block copolymer remains unreacted with the SiH from starting material A), and thereafter starting material F) is added such that the SiH on starting material F) reacts with the remaining aliphatically unsaturated group from starting material B). In this manner, a copolymer with BAB architecture, or a copolymer with B(AB)n architecture may be prepared comprising alkoxy-silyl hydrocarbylene functional terminal groups.

Copolymer

The polyolefin-polydiorganosiloxane block copolymer prepared as described above comprises unit formula (I):

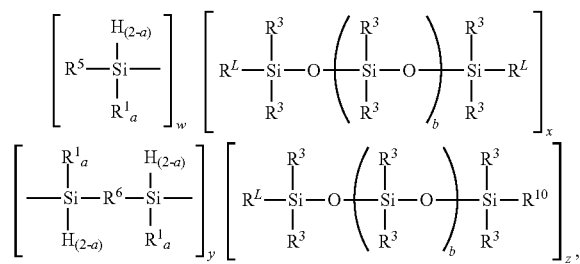

where $R^1$, $R^3$, $R^{10}$, subscript a, and subscript b are as described above.

Each $R^L$ is a divalent hydrocarbyl group. As shown above in unit formula (I), the $R^L$ group links the polyolefin and polyorganosiloxane blocks of the copolymer. Each $R^L$ is a reaction product of a silicon bonded hydrogen atom of starting material A) the silyl terminated polyolefin and a terminally aliphatically unsaturated organic group ($R^2$) of starting material B) the polydiorganosiloxane. Suitable divalent hydrocarbyl groups for $R^L$ are exemplified by the groups described above for $R^D$. Alternatively, each $R^L$ is a group of formula $-C_2H_4-$ or $-C_3H_6-$.

Each $R^5$ is an independently selected hydrogen terminated polyolefinic block. Each $R^5$ may have unit formula: $H[(R^{et})_t(R^O)_u]_g$, where $R^{et}$, $R^O$, and subscripts t, u and g are as described above. Alternatively, each $R^5$ may have unit formula (II): $H[(CH_2CH_2)_t(CHR^7CH_2)_u]_g$, where $R^7$ and subscripts t, u, and g are as described above. Alternatively, the hydrogen terminated polyolefinic block may be a hydrogen terminated ethylene polymeric block. Alternatively, the divalent polyolefinic block may be a hydrogen terminated ethylene-octene copolymeric block.

Each $R^6$ is an independently selected divalent polyolefinic block. Each $R^6$ may have unit formula $[(R^{et})_t(R^O)_u]_g$, where $R^{et}$, $R^O$, and subscripts t, u and g are as described above. Alternatively, each $R^6$ may have unit formula (III): $[(CH_2CH_2)_t(CHR^7CH_2)_u]_g$ where $R^7$ and subscripts t, u, and g are as described above. Alternatively, the divalent polyolefinic block may be a divalent ethylene polymeric block. Alternatively, the divalent polyolefinic block may be a divalent ethylene-octene copolymeric block.

Each $R^{10}$ is independently selected from $R^3$ and an alkoxysilyl functional hydrocarbylene containing group. In one embodiment, each $R^{10}$ is $R^3$ (i.e., when starting material F) is not used to prepare the polyolefin-polydiorganosiloxane block copolymer). Alternatively, at least some instances of $R^{10}$ may have a formula selected from:

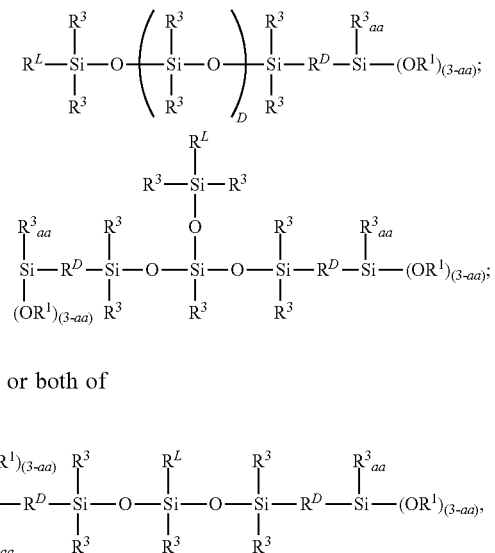

one or both of

-continued

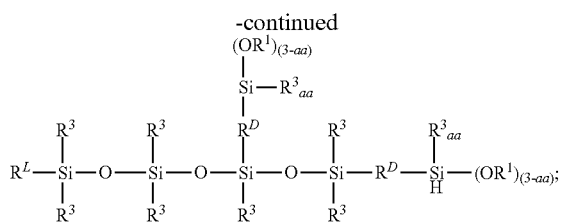

and $(R^3{}_2SiO_{2/2})_E(R^3R^LSiO_{2/2})_F$

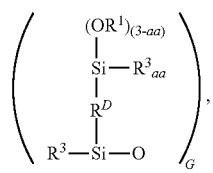, where $R^1$, $R^3$, $R^D$, $R^L$, and subscripts aa, D, E, F, and G are as described above.

In unit formula (I) above, subscript w is 0 to 2. Subscript x is 0 or a positive number. Subscript y is 0 or a positive number. Subscript z is 0 to 2. A quantity $(w+y) \geq 1$. A quantity $(x+z) \geq 1$. When subscript w=0, subscript z is >0. When subscript z=0, subscript w>0.

In one embodiment, in unit formula (I), subscript x=0, subscript y=0, subscript w=1 and subscript z=1. In this embodiment, the polyolefin-polydiorganosiloxane block copolymer has an AB architecture. In this embodiment, the copolymer has formula (IV):

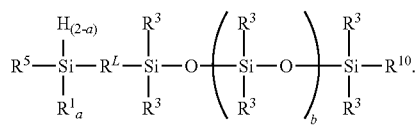

where $R^L$, $R^1$, $R^3$, $R^5$, $R^{10}$, subscript a, and subscript b are as described above.

In an alternative embodiment, in unit formula (I), subscript w=2, subscript z=0, subscript x≥1, and subscript y≥0. In this embodiment, the polyolefin-polydiorganosiloxane block copolymer has formula (V):

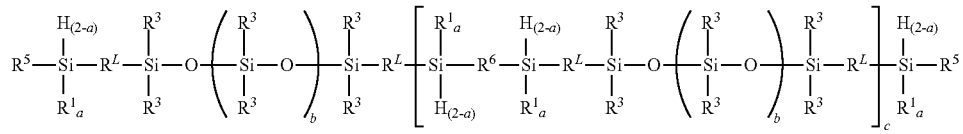

where $R^L$, $R^1$, $R^3$, $R^5$, $R^6$, subscript a, and subscript b are as described above; and subscript c is 0 or a positive number. Alternatively, subscript c may be 1 to 1,000; alternatively 2 to 1,000; alternatively 1 to 100, and alternatively 2 to 100. Alternatively, subscript c>0 in formula (V), i.e., when in unit formula (I), subscript w=2, subscript x>1, subscript y>1, and subscript z=0. Alternatively, when subscript c=0, the polyolefin-polydiorganosiloxane block copolymer has an (ABA) architecture.

In an alternative embodiment, in unit formula (I), subscript w=2, subscript x=1, subscript y=0 and subscript z=0, and the copolymer has an (ABA) architecture. This copolymer has formula (VI):

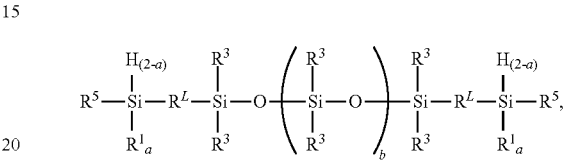

where $R^L$, $R^1$, $R^3$, $R^5$, subscript a, and subscript b are as described above. This copolymer can be made in the method described above where starting material A) has one silyl terminal group per molecule and starting material B) has two terminal organic groups having terminal aliphatic unsaturation per molecule (telechelic).

In an alternative embodiment, in unit formula (I), subscript z=2, subscript w=0, subscript x≥0, and subscript y≥1, and the polyolefin-polydiorganosiloxane block copolymer has formula (VII):

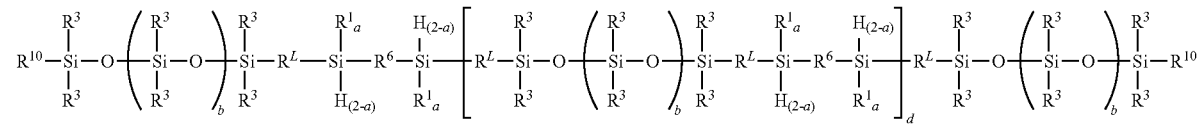

where $R^L$, $R^1$, $R^3$, $R^6$, $R^{10}$, subscript a, and subscript b are as described above; and subscript d is 0 or a positive number. Alternatively, subscript d may be 1 to 1,000; alternatively 2 to 1,000; alternatively 1 to 100, and alternatively 2 to 100. Alternatively, subscript d>0 in formula (VII), i.e., when in unit formula (I), subscript w=0, subscript x>1, subscript y>1, and subscript z=2. Alternatively, subscript d=0, and the copolymer has a (BAB) architecture.

In an alternative embodiment, in unit formula (I), subscript w=0, subscript x=1, subscript y=0 and subscript z=2, and the polyolefin-polydiorganosiloxane block copolymer has formula (VIII):

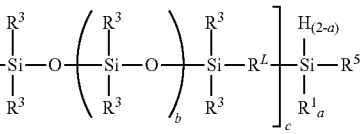

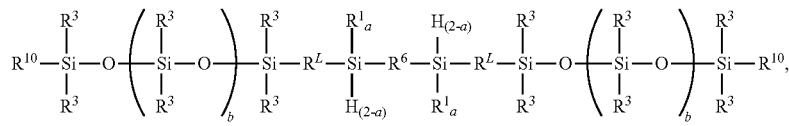

where $R^L$, $R^1$, $R^3$, $R^6$, $R^{10}$, subscript a, and subscript b are as described above. This copolymer can be made in the method described above where starting material B) has one terminal organic group having terminal aliphatic unsaturation per molecule, and starting material A) is telechelic.

Alternatively, any one of formulae (I) and (IV) to (VIII) may have one or more of: each $R^1$ being methyl, each $R^3$ being methyl, and each $R^L$ being $-C_2H_4-$. In this embodiment, each $R^5$ may be hydrogen terminated polyethylene or hydrogen terminated poly(ethylene/octene) and each $R^6$ may be polyethylene or poly(ethylene/octene).

EXAMPLES

These examples are intended to illustrate some embodiments of the invention and should not be interpreted as limiting the scope of the invention set forth in the claims.

A polyethylene-polydimethylsiloxane diblock copolymer with AB architecture was prepared in this Example 1, as follows:

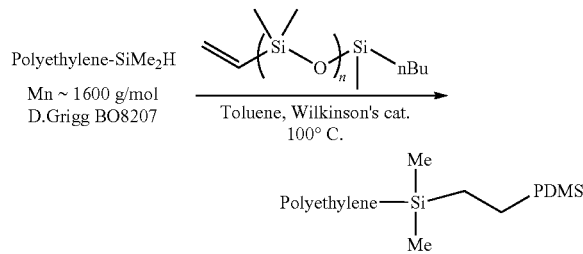

A polyethylene having one terminal group of formula $-Si(CH_3)_2H$ per molecule and 1.6 kDa (200 mg) and 900 mg of monovinyl-terminated polydimethylsiloxane having a Mw of 5,500 to 6,500 (commercially available from Gelest) were taken up in 3 mL of toluene at 100° C. Then, 1 mL of a stock solution of Wilkinson's catalyst (5.8 mg, 0.05 equiv.) was added, and the resulting yellow solution was stirred for 21 hr then precipitated into methanol. The resulting diblock copolymer was redissolved in toluene and reprecipitated into methanol then filtered and dried under vacuum at 100° C. for 1 hr to yield 850 mg of a waxy copolymer. The $^1$H NMR spectrum was consistent with 50% conversion to the diblock copolymer, with no apparent residual SiH functionality as indicated by the disappearance of the SiH resonance at 4.04 ppm.

A polyethylene-polydimethylsiloxane triblock copolymer with ABA architecture was prepared in this Example 2, as follows. In a container were combined 4.43 weight parts of an α,ω-vinyl terminated polydimethylsiloxane having DP of 124 and 1.6 mol % vinyl groups, 1 weight part of a polyethylene having one terminal group of formula $-Si(CH_3)_2H$ per molecule and Mn of 1,050, and 21.72 weight parts of toluene. The container was heated with an external heater at 105° C., and Karstedt's catalyst was added to the container in an amount sufficient to provide 320 ppm of platinum to the reaction mixture. Heating at 105 C continued for 4 hr. IR analysis for SiH showed the reaction was complete by absence of detectable SiH. The resulting reaction product was stripped to dryness using a rotary evaporator with an oil bath temperature of 120° C. and 1 to 2 mmHg pressure. After 30 minutes, the bulk of the toluene solvent was removed. At 120° C., the resulting copolymer was a hazy viscous liquid. At room temperature, the copolymer was a translucent to opaque wax.

A polyethylene-polydimethylsiloxane-polyethylene triblock copolymer was prepared in this Example 3, as follows. This copolymer had the following respective block number average molecular weights: 1030 g/mol PE—9,200 g/mol PDMS—1030 g/mol PE. The reagents used to prepare this copolymer were:

Vinyl terminated PDMS with DP=124, FW=74.47 g/mol Si; 1.60 mol % M(Vi); and 4654 g/mol Vinyl.
Mono-SiMe$_2$H terminated polyethylene (Mn=1030)
Toluene-Fisher Scientific ACS grade
Pt Karstedt's catalyst Synthesis procedure: A 100 mL round bottom flask was loaded with: the Vinyl terminated PDMS (6.78 g, 0.00146 mols Vi), the mono-SiMe$_2$H terminated polyethylene (1.50 g, 0.00146 mols SiH), and toluene (33.12 g). The solution was heated at reflux for 15 minutes to remove any water that might be present. Karstedt's catalyst in solution (solution containing 300 ppm Pt) was added amounting to 20 ppm Pt based on solids. An aluminum block heater was used. After heating at reflux for 24 hours, IR analysis showed reaction was complete as deduced from the disappearance of the SiH absorption. The product was stripped to dryness using a rotary evaporator (rotovapor) at an oil bath temperature of 120° C. and 1 mm Hg. The resulting product was a low viscosity liquid with a light haze at 120° C. and a hard translucent wax at room temperature.

Additional triblock copolymers with ABA architecture were made based on the procedure in example 3 with the following characteristics (Mn in g/mol):

| Example | Mn PE | Mn PDMS | % PE in triblock |
|---|---|---|---|
| 3 | 869 | 4362 | 28.5% |
| 4 | 1205 | 9308 | 20.6% |
| 5 | 1429 | 9308 | 23.5% |
| 6 | 1037 | 9308 | 18.2% |
| 7 | 1429 | 4362 | 39.6% |
| 8 | 1205 | 13402 | 15.2% |
| 9 | 1050 | 9308 | 18.4% |
| 10 | 1050 | 4362 | 32.5% |
| 11 | 1429 | 13402 | 17.6% |
| 12 | 2062 | 13402 | 23.5% |
| 13 | 3500 | 13402 | 34.4% |
| 14 | 3500 | 24642 | 22.1% |
| 15 | 1500 | 9308 | 24% |
| 16 | 869 | 9308 | 16.1% |

Mixtures of polyethylene-polydimethylsiloxane-polyethylene triblock/polyethylene-polydimethylsiloxane diblock copolymers were also prepared, with their characteristics detailed in Table 1B. These mixtures were prepared by reacting mono SiMe$_2$H terminated PE with telechelic vinyl terminated polydimethylsiloxane (Vi-PDMS-Vi) at a vinyl to SiH stoichiometry molar ratio of 2 to 1. One such copolymer will be detailed here, specifically Example 22 in Table 1 bB. The procedure was as follows. 10 g of a telechelic vinyl terminated PDMS with Mn of 13,402 g/mol and vinyl equivalent weight of 6,701 g/mol vinyl was loaded into a 100 mL round bottom flask together with 1.07 g of a mono SiH terminated polyethylene with Mn of 1,429 g/mol and 44.3 g of toluene. The mixture was heated to 105° C. using an aluminum block heater. Once the solution was homogeneous, 10 ppm Pt (Karstedt's catalyst, 0.17 g of a solution containing 636 ppm Pt) based on solids was added. The mixture was kept at 105° C. for a total of 2.5 hrs. Infrared analysis for SiH confirmed reaction completion after this time. The product was then solvent stripped using a rotovapor with an oil bath temperature of 120° C. and 1-2 mmHg vacuum. After 30 min the solvent had been removed and the product was a low viscosity hazy liquid at this temperature. Once cooled down to room temperature, the product was a translucent soft wax.

Additional diblock/triblock copolymer mixtures were made based on the procedure in example 11, by varying amounts of starting materials, and these are listed in Table 1B.

TABLE 1B

Characteristics of diblock/triblock copolymers prepared from mono —Si(CH₃)₂H (SiH) functional high density polyethylene (PE) and α,ω-vinyl terminated polydimethylsiloxane (Vi-PDMS-Vi); the number average molecular weight Mn from GPC was listed in addition to the total weight % of PE in the copolymers

| BCP Example | Mn PE | Mn PDMS | % PE |
|---|---|---|---|
| 17 | 869 | 4362 | 17 |
| 18 | 1205 | 9308 | 11 |
| 19 | 1429 | 9308 | 13 |
| 20 | 1429 | 4362 | 25 |
| 21 | 1205 | 4362 | 22 |
| 22 | 1429 | 13402 | 10 |
| 23 | 1037 | 4362 | 19 |
| 24 | 1429 | 13402 | 10 |
| 25 | 1205 | 9308 | 11 |
| 26 | 1037 | 9308 | 10 |
| 27 | 1429 | 4362 | 25 |
| 28 | 869 | 13402 | 6 |
| 29 | 880 | 4362 | 17 |
| 30 | 4750 | 13402 | 26 |
| 31 | 1500 | 9308 | 13.9 |

Reference Example 1—GPC Test Method

The copolymer samples prepared as described above (and the silyl terminated polyolefin samples prepared as described in the Reference Examples, below) were analyzed on a PolymerChar GPC-IR maintained at 160° C. Each sample was eluted through 1×PIgel 20 µm 50×7.5 mm guard column and 4×PIgel 20 µm Mixed A LS 300×7.5 mm columns with 1,2,4-trichlorobenzene (TCB) stabilized by 300 ppm of butylated hydroxyl toluene (BHT) at a flowrate of 1 mL/min. The 16 mg of copolymer sample was weighed out and diluted with 8 mL of TCB by the instrument. For molecular weight, a conventional calibration of polystyrene (PS) standards (Agilent PS-1 and PS-2) was used with apparent units adjusted to homo-polyethylene (PE) using known Mark-Houwink coefficients for PS and PE in TCB at this temperature. Decane was used as an internal flow marker and retention time was adjusted to this peak. For the comonomer incorporation, copolymers of known composition were used to develop a calibration curve for incorporation.

Silyl-terminated polyolefins used in Examples 1 to 29 described above were prepared as described in the following Reference Examples.

Reference Example 2—Procedure for Silylation of Di-Polyethylene-Zinc with HMe₂SiCl Di-polyethylene-zinc and Isopar (Mw=1580 Da, 10 mM) were placed in a vial. The vial was heated at 120° C. until the contents became clear and homogeneous. dimethylhydrogenchlorosilane and NMI were added to the vial. The vial was heated at 90° C. for 3 hours. Iodine (I₂) was then added to quench unreacted di-polyethylene zinc. The resulting product was evaluated by ¹H NMR. The molar equivalents of HMe₂SiCl and conversion to product results are shown below in Reference Table 2.

REFERENCE TABLE 2

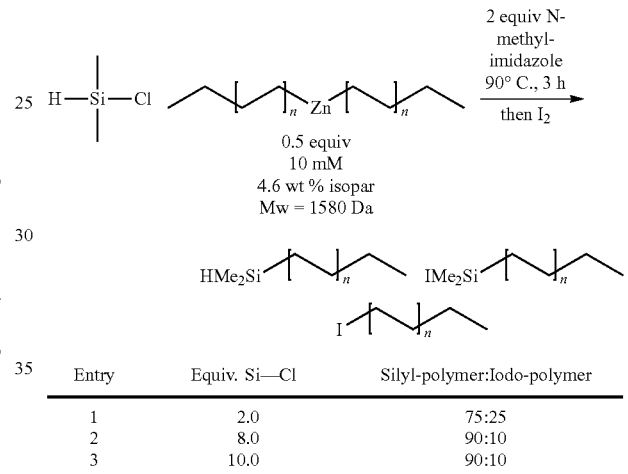

| Entry | Equiv. Si—Cl | Silyl-polymer:Iodo-polymer |
|---|---|---|
| 1 | 2.0 | 75:25 |
| 2 | 8.0 | 90:10 |
| 3 | 10.0 | 90:10 |

Silyl:iodo ratio measured by ¹H NMR Integrations

Reference Example 2 showed that when a relatively volatile chlorosilane was used, improved silylation was achievable with extra equivalents of the chlorosilane.

Reference Example 3—Procedure for Silylation of Di-Polyethylene-Zinc with HPh₂SiCl Reference Example 2 was repeated, except that diphenylhydrogenchlorosilane was used instead of dimethylhydrogenchlorosilane. The results are shown below in Reference Table 3.

REFERENCE TABLE 3

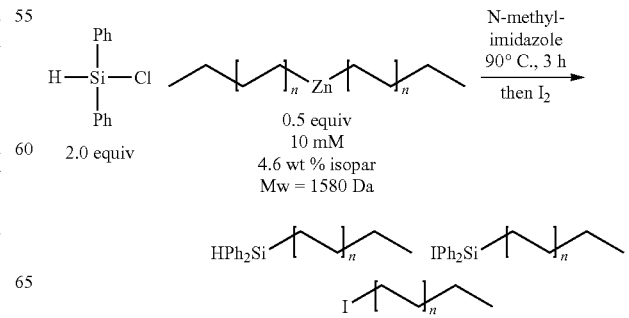

REFERENCE TABLE 3-continued

| Entry | Equiv. NMI | Silyl-polymer:Iodo-polymer |
|---|---|---|
| 1 | 2.0 | 80:20 |
| 2 | 0 | <5:95 |
| 3 | 1.0 | 20:80 |
| 4 | 0.1 | 5:95 |

Silyl:iodo ratio measured by $^1$H NMR Integrations

Reference Example 3 showed that complete silylation of the di-polyethylene-zinc was possible using NMI as an additive.

Reference Example 4—Procedure for Silylation of Di-Polyethylene-Zinc with H$_2$PhSiCl Di-polyethylene-zinc and Isopar (Mw=1580 Da, 10 mM) were placed in a vial. The vial was heated at 120° C. until the contents became clear and homogeneous. Phenyl,dihydrogen,chlorosilane and an additive NMI or blend of NMI with TMEDA) were added to the vial. The vial was heated for a period of time. Iodine (I$_2$) was then added to quench unreacted di-polyethylene zinc. The resulting product was evaluated by $^1$H NMR. The molar equivalents of chlorosilane, of additive, the time and temperature for heating, and conversion to product results are shown below in Reference Table 4.

REFERENCE TABLE 4

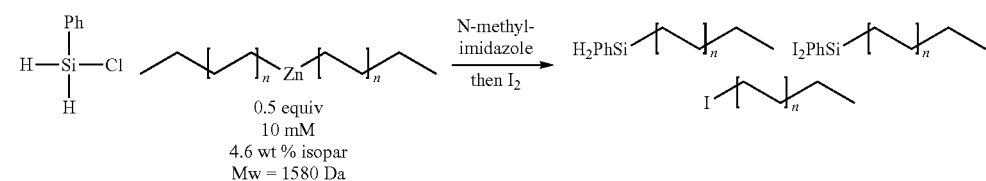

| Entry | Equiv. NMI | Equiv. Chlorosilane | temp. (° C.) | time (h) | Silyl-polymer:Iodo-polymer |
|---|---|---|---|---|---|
| 1 | 2.0 | 2.0 | 90 | 3 | >95:5 |
| 2 | 0.2 | 2.0 | 90 | 3 | 19:81 |
| 3 | 1.2 | 2.0 | 90 | 3 | >95:5 |
| 4 | 2.0 | 1.2 | 90 | 3 | >95:5 |
| 5 | 0.2 (0.55 equiv TMEDA) | 1.2 | 90 | 3 | 50:50 |
| 6 | 1.2 | 1.2 | 120 | 0.5 | >95:5 |

Silyl:iodo ratio measured by $^1$H NMR Integrations

Reference Example 5 showed that complete silylation with phenyl,dihydrogen,chlorosilane was observed with the conditions described in Entry 6. At least 1 equivalent of NMI was capable of completing the hydrosilylation. A blend of NMI and another amine base was used as the additive for comparative purposes in Entry 5.

Reference Example 5

Di-polyethylene-zinc and Isopar (Mw=1080 Da, 10 mM) were placed in a vial. The vial was heated at 120° C. until the contents became clear and homogeneous. Phenyl,dihydrogen,chlorosilane and an additive were added to the vial. The vial was heated at 100° C. for 1 hour. Iodine (I$_2$) was then added to quench unreacted di-polyethylene zinc. The resulting product was evaluated by $^1$H NMR. The additive and conversion to product results are shown below in Reference Table 5.

REFERENCE TABLE 5

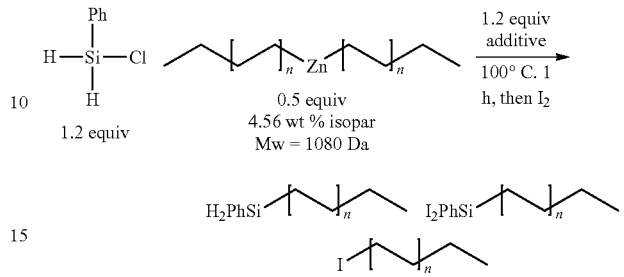

| Entry | Additive | Silyl-polymer:Iodo-polymer |
|---|---|---|
| 1 | TMAF | 51:49 |
| 2 | N-methyl-2-pyridone | 79:21 |
| 3 | DMPU | 89:11 |
| 4 | DMF | 53:47 |
| 5 | DMAP | >95:5 |
| 6 | Triethylamine | 36:64 |
| 7 | Pyridine N-oxide | >95:5 |
| 8 | none | 28:72 |

Silyl:iodo ratio measured by $^1$H NMR Integrations

Reference Example 5 showed that complete silylation was observed under the conditions tested using 4-dimethylaminopyridine, and pyridine-N-oxide as the additive. The example also showed that N-methyl pyridone and DMPU can also be used as the additive to promote silylation because as shown in Entry 2 and Entry 3, more silyl polymer formed than the comparative control (Entry 8) with no additive.

Reference Example 6

Reference Example 2 was repeated using phenylhydrogendichlorosilane (HPhSiCl$_2$) instead of HMe$_2$SiCl and using 1.2 equivalents of NMI instead of 2 equivalents as the additive. The results are shown in Reference Table 6, below.

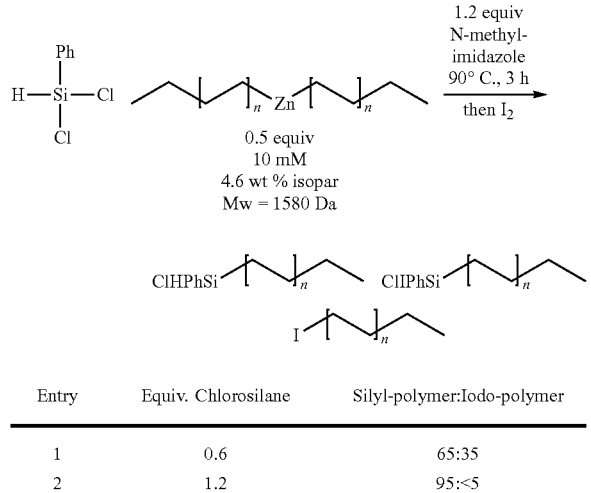

| Entry | Equiv. Chlorosilane | Silyl-polymer:Iodo-polymer |
|---|---|---|
| 1 | 0.6 | 65:35 |
| 2 | 1.2 | 95:<5 |

Silyl:iodo ratio measured by $^1$H NMR Integrations

Reference Example 6 showed that substitution occurred at only one of the two Si—Cl bonds, even when the amount of phenylhydrogendichlorosilane was reduced.

Reference Example 7

Di-polyethylene-zinc and Isopar (Mw=1205 Da, 10 mM) were placed in a vial. The vial was heated at 120° C. until the contents became clear and homogeneous. Dimethylhydrogeniodosilane and NMI were added to the vial. The vial was heated at 110° C. for 3 hours. Iodine ($I_2$) was then added to quench unreacted di-polyethylene zinc. The resulting product was evaluated by $^1$H NMR. The molar equivalents of $HMe_2SiI$ and conversion to product results are shown below in Reference Table 7.

REFERENCE TABLE 7

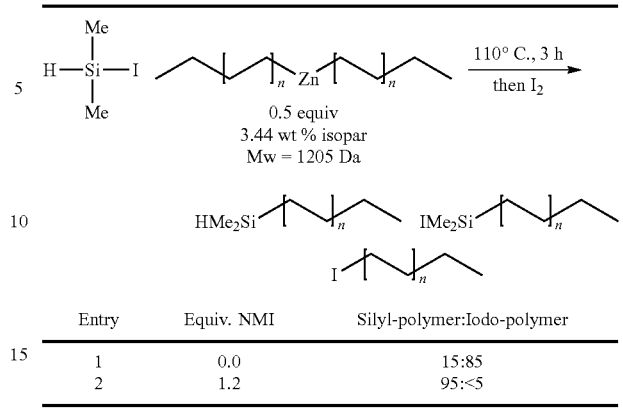

| Entry | Equiv. NMI | Silyl-polymer:Iodo-polymer |
|---|---|---|
| 1 | 0.0 | 15:85 |
| 2 | 1.2 | 95:<5 |

Silyl:iodo ratio measured by $^1$H NMR Integrations

Reference Example 7 showed that NMI also promoted silylation with halosilanes other than chlorosilanes (e.g., iodosilanes). In the absence of NMI, the iodosilane was not electrophilic enough to undergo complete reaction with the dipolyethylene-zinc under the conditions tested in this example.

Reference Example 8

Silylation of an ethylene/octene polymeryl zinc with phenyldihydrogenchlorosilane was performed as follows. In a glovebox, a 20 mL vial was charged with the copolymerylzinc (Mn=1940 Da, 30.66% octene, 3.10% polymer in Isopar™ E, 14.95 g, 0.117 mmol, 0.500 equiv). The mixture was stirred and heated to 110° C. until the mixture became clear and homogeneous. NMI (22.5 µL, 0.282 mmol, 1.20 equiv) was added, followed by chlorophenylsilane (37.6 µL 0.282 mmol, 1.20 equiv). The mixture was stirred for 1 hour. A portion of the solution was removed and quenched with an excess of iodine for conversion analysis. The polymer solution was poured into an excess of methanol, which precipitated polymer. The polymer was isolated by filtration and was dried in a vacuum oven.

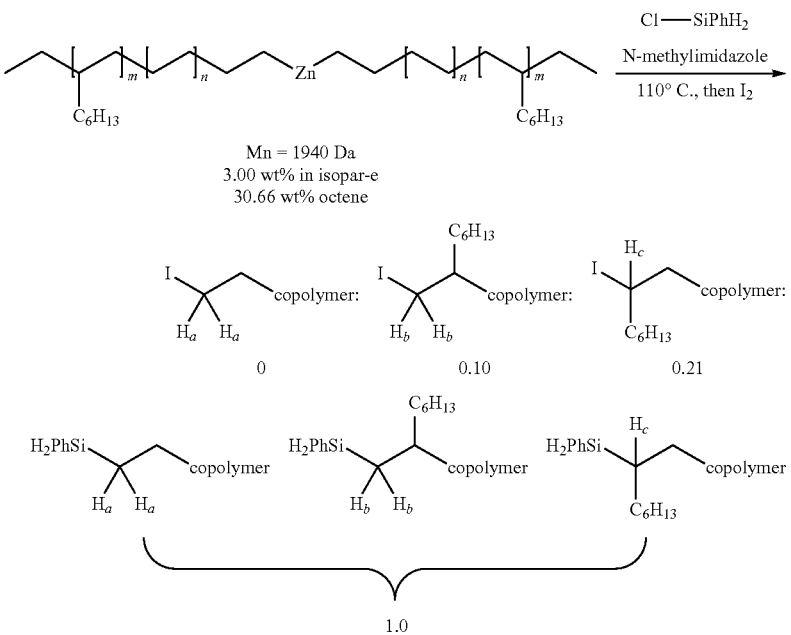

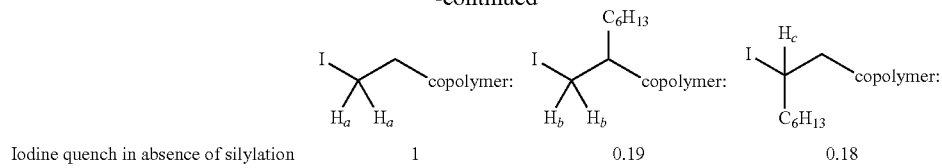

| Iodine quench in absence of silylation | 1 | 0.19 | 0.18 |

Reference Example 8 showed that silylation with an ethylene/octene copolymeryl-zinc is possible using NMI.

Reference Example 9

This Reference Example 9 shows a water washing method used to purify 850 g/mol Mn mono-SiH terminated polyethylenes prepared as described above. 0.90 g of mono-SiH polyethylene prepared as described above was diluted to 10% in toluene in a 100 mL round bottom flask containing a magnetic stir bar. The solution was heated by placing the flask in an aluminum block at a temperature of 85° C. The mono-SiH terminated polyethylene dissolved. Deionized water (6 g) was added and mixed for 5 minutes. Stirring was then stopped, and the aqueous phase (on bottom) was removed using a plastic pipette. Excellent separation was achieved. Both phases were clear, and the pH of wash water was alkaline.

The following process was performed 7 times at 85° C. Deionized water (4 g) was added and mixed for 5 minutes. The aqueous phase was removed. The resulting solution of toluene and mono-SiH terminated polyolefin was poured onto a Teflon™ sheet to dry overnight. The pH of the final water wash was on the slightly acidic side, indicating that the imidazole was successfully removed.

Reference Example 10—General Procedure for Preparation of Silyl Terminated Organo-Metal Polymerizations were conducted in a 2 L PARR batch reactor. The reactor was heated by an electrical heating mantle and was cooled by an internal serpentine cooling coil containing cooling water. Both the reactor and the heating/cooling system were controlled and monitored by a CAMILE TG process computer. The bottom of the reactor was fitted with a dump valve, which emptied the reactor contents into a stainless steel dump pot. The dump pot was vented to a 30 gallon blow-down tank, with both the pot and the tank purged with nitrogen. All solvents used for polymerization or catalyst makeup were run through solvent purification columns to remove any impurities that may affect polymerization. The 1-octene, Isopar™ E, and toluene were passed through two columns, the first containing A2 alumina, the second containing Q5. The ethylene was passed through 2 columns, the first containing A204 alumina and 4 Å mol sieves, the second containing Q5 reactant. The nitrogen, used for transfers, was passed through a single column containing A204 alumina, 4 Å mol sieves and Q5.

The desired amount of Isopar™ E and/or toluene solvent and/or 1-octene was added via shot tank to the load column, depending on desired reactor load. The load column was filled to the load set points by use of a lab scale to which the load column was mounted. After liquid feed addition, the reactor was heated up to the polymerization temperature set point. If ethylene was used, it was added to the reactor when at reaction temperature to maintain reaction pressure set point. Ethylene addition amounts were monitored by a micro-motion flow meter.

The scavenger, MMAO-3A (which is commercially available from Akzo Nobel), was handled in an inert glove box, drawn into a syringe and pressure transferred into the catalyst shot tank. This was followed by 3 rinses of toluene, 5 mL each, before being injected into the reactor. The chain-shuttling agent was handled in an inert glove box, drawn into a syringe and pressure transferred into the catalyst shot tank. This was followed by 3 rinses of toluene, 5 mL each, before being injected into the reactor. The procatalyst and activators were mixed with the appropriate amount of purified toluene to achieve a desired molarity solution. The catalyst and activators were handled in an inert glove box, drawn into a syringe and pressure transferred into the catalyst shot tank. This was followed by 3 rinses of toluene, 5 mL each. Immediately after catalyst addition, the run timer began. If ethylene was used, it was then added by the CAMILE to maintain reaction pressure set point in the reactor. These polymerizations were either run for 10 minutes, or a targeted ethylene uptake. The agitator was then stopped and the bottom dump valve opened to empty reactor contents into a clean dump pot that had been stored in a 130° C. oven for greater than 60 minutes before use to drive off any excess water absorbed by the metal surface. Once the contents of the reactor were emptied into the dump pot, the normal flow of nitrogen inerting was switched to argon, via a ball valve. The argon flowed for a calculated period of time to allow five exchanges of the volume of gas in the pot. When the argon inerting was complete, the dump pot was lowered from its fixture, and a secondary lid with inlet and outlet valves was sealed to the top of the pot. The pot was then inerted with argon for an additional five exchanges of gas, via a supply line and inlet/outlet valves. When complete, the valves were closed. The pot was then transferred to a glove box without the contents coming into contact with the outside atmosphere.

Reference Example 11—Preparation of Samples According to General Procedure of Reference Example 10

A homopolyethylene sample was prepared following the general procedure in Reference Example 10 using the following conditions: 120° C., 23 g of initial ethylene loaded, 600 g toluene, 10 µmol MMAO-3A, 1.2 eq. of activator to procatalyst. The amount of procatalyst used was adjusted to reach a desired efficiency. The reactor pressure and temperature was kept constant by feeding ethylene during the polymerization and cooling the reactor as needed. The polymerization was performed with bis(hydrogenated tallow alkyl)methylammonium tetrakis(pentafluorophenyl)borate as the activator, bis(N-isobutyl-6-mesitylpyridin-2-amine) dimethylhafnium as the procatalyst, and bis(8-(dimethylsilyl)octyl)zinc as the chain shuttling agent. $^1$H-NMR Mn: 1586 per chain, GPC Mn: 1310 per chain.

A poly(ethylene/octene) copolymer sample was prepared following the general procedure in Reference Example 10 using the following conditions: 120° C., 23 g of initial ethylene loaded, 397 g Isopar™ E, 115 g 1-octene, 10 μmol MMAO-3A, 1.2 eq. of activator to procatalyst. The amount of procatalyst used was adjusted to reach a desired efficiency. The reactor pressure and temperature was kept constant by feeding ethylene during the polymerization and cooling the reactor as needed. The polymerization was performed with bis(hydrogenated tallow alkyl)methylammonium tetrakis(pentafluorophenyl)borate as the activator, Preparation of [N-[2,6-Bis(1-methylethyl)phenyl]-α-[2-(1-methylethyl)-phenyl]-6-(1-naphthalenyl-C2)-2-pyridinemethanaminato]dimethylhafnium as the procatalyst, and bis(8-(dimethylsilyl)hexyl)zinc as the chain shuttling agent. GPC Mn: 25,020 per chain, Co-monomer incorporation: 48% 1-octene.

Reference Example 12—Preparation of a Telechelic Silyl Terminated Polyolefin

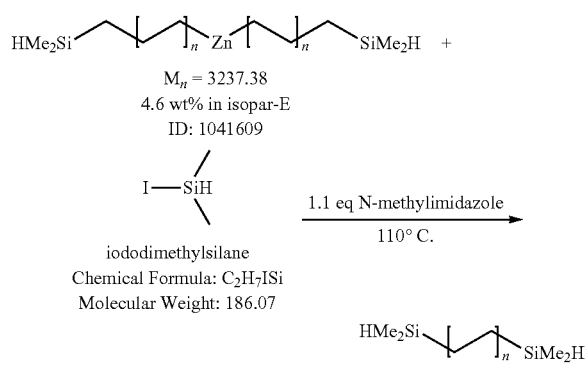

In a nitrogen-filled glovebox, a 1 L jar with a 4.6% suspension of polymeryl zinc in Isopar™ E ($^1$H-NMR Mn=1586 per chain, GPC Mn=1310 per chain) was split roughly equally into two 1 L round bottom flasks. Flask one contained 355 g (16.3 g of polymeryl zinc) and flask two contained 379.7 g (17.5 g of polymeryl zinc). Both flasks were heated to 110° C. in the glovebox until the solutions became homogeneous.

Once the solutions became homogeneous, the following starting materials were added. To flask one was then added 0.91 g of NMI (11.1 mmol, 0.88 mL, 1.1 equiv per chain) and 2.2 g of 87% pure dimethylhydrogeniodosilane (17.5 mmol, 1.1 equiv per chain). To flask two was added 0.97 g of NMI (11.87 mmol, 0.95 mL, 1.1 equiv per chain) and 2.37 g (11.87 mmol, 1.1 equiv per chain) of 87% pure dimethylhydrogeniodosilane. The flasks were heated at 110° C. for 45 minutes, after which an aliquot was removed for NMR analysis to confirm the disappearance of the C—Zn species. After this was confirmed and a total of 1.5 h of heating, the solutions in the jars were cooled to room temperature. The solutions were then each poured into a stirring beaker of methanol (1 L). The precipitate was collected in a disposable plastic fritted filter and dried overnight in a vacuum oven at 40° C.

The precipitate was then transferred to two 1 L round bottom flasks and dissolved in 200 mL of toluene at 110° C. Then, 80 mL of deionized water as added to the flask and stirred vigorously with a reflux condenser and a blanket of nitrogen. After at least 10 minutes of stirring, the stirring was stopped and the two phases were allowed to separate. Using a pipette, the aqueous layer was removed as much as possible and discarded. This process was repeated three more times for a total of four washings. After the fourth wash, the flasks were cooled to room temperature and precipitated from a stirring solution of methanol (1 L each). The precipitate was washed with methanol and then dried in a vacuum oven at 40° C. overnight.

30.55 g of telechelic HMe$_2$Si-terminated polyethylene was isolated (90% yield). Mn measured by $^1$H-NMR of the functionalized material including chain ends after accounting for the percentage of dead chains was 1427. The Mn of only the polyethylene segment of functionalized chains was 1307. A signal at 0.97 ppm with triplet multiplicity was attributed to methyl-terminated chain ends that correspond to 13.5% dead chain ends. GPC Mn=1280, Mw=1670, and Đ=1.28.

Example 30—Preparation of Polyethylene-Polydimethylsiloxane Block Copolymer Comprising (AB)n Architecture Using the Telechelic Silyl Terminated Polyolefin of Reference Example 13

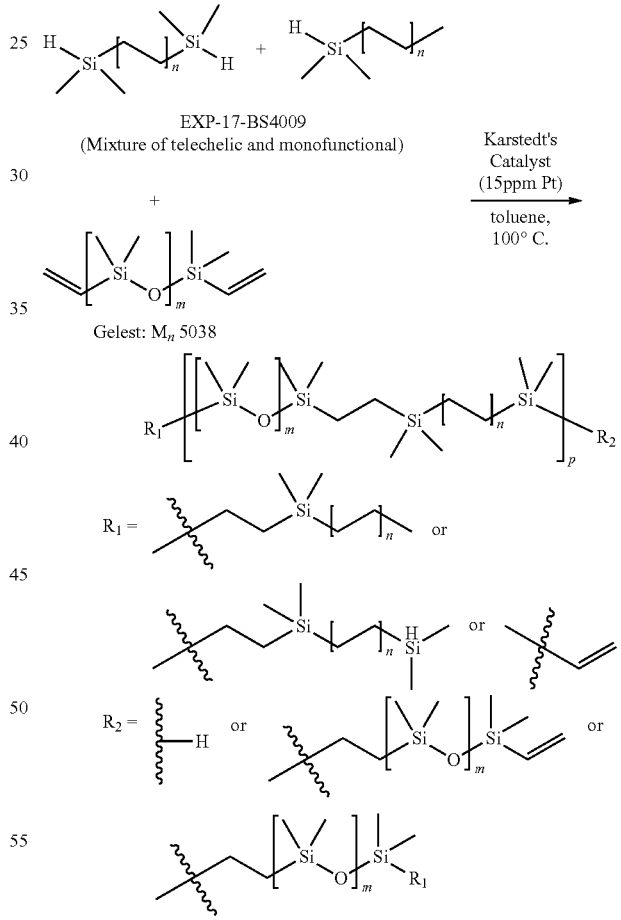

In this example, 0.300 g (0.154 mmol by SiH functional group, 1 equiv.) of a mixture of mono —SiMe$_2$H functionalized polyethylene and telechelic —SiMe$_2$H terminated polyethylene (Mn=1390 by GPC, 1948 by NMR) was brought into a nitrogen filled glovebox in a 20 mL scintillation vial. 0.72 g of telechelic, telechelic vinyl terminated polydimethylsiloxane (DMS-V21, commercially available from Gelest; Mn 5038 by NMR) was weighed directly into the vial inside the glovebox. The vial was heated to 100° C. and stirred gently to avoid splashing. The polyethylene melted but did not become completely homogeneous. Then 0.039 mL of 0.1% Pt dilution of Karstedt's catalyst in toluene was added and the reaction was stirred at 100° C. After 2 hours, a small aliquot was removed for $^1$H-NMR analysis, which indicated the complete disappearance of the SiH signal. The reaction was cooled to room temperature, removed from the glovebox, cooled to room temperature, and precipitated from isopropanol to remove the excess PDMS. 0.835 g of material was isolated. $^1$H-NMR of the final product confirmed complete consumption of the SiH. There was a small amount of vinyl group, indicating some leftover PDMS. Estimation of GPC by taking a weighted average of polyethylene/polydimethylsiloxane signals indicates a degree of polymerization of approximately 5 (polyethylene/polydimethylsiloxane) units.

Example 31—Preparation of Polyethylene-Polydimethylsiloxane Block Copolymer Comprising BAB Architecture Using the Telechelic Silyl Terminated Polyolefin of Reference Example 13

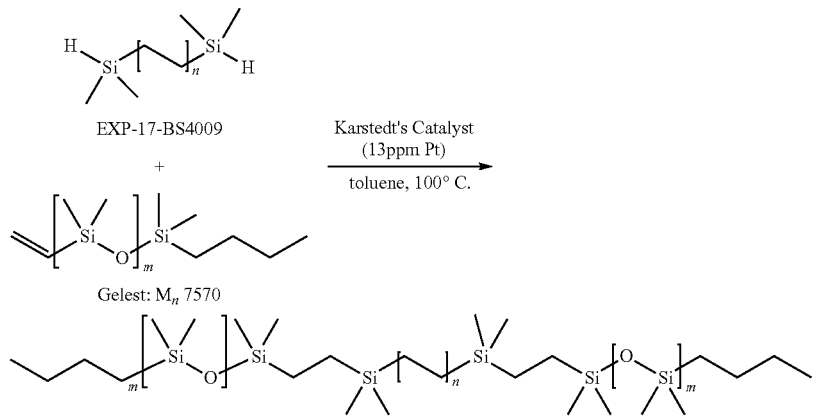

In this example, 0.300 g (0.154 mmol by SiH functional group, 1 equiv.) of 81.5% —SiMe$_2$H functionalized, telechelic polyethylene (Mn 1390 by GPC, 1948 by NMR) was brought into a nitrogen filled glovebox in a 20 mL scintillation vial. 2.49 g (0.329 mmol, 2.1 equiv) of monovinyl-terminated PDMS (MCR-V21, commercially available from Gelest with Mn determined to be 7570 by NMR) was weighed directly into the vial inside the glovebox. The 1.5 mL of toluene was added and the vial was heated to 100° C. and stirred gently to avoid splashing. The polyethylene melted but did not become completely homogeneous. First, 0.039 mL of 0.1% Pt dilution of Karstedt's catalyst in toluene was added and the reaction mixture was stirred at 100° C. for 1 h. The reaction mixture became clearer upon addition of the catalyst. However 39% of the SiH remained so an additional 0.017 mL of Karstedt's catalyst solution was added. The reaction mixture was allowed to stir overnight at 85° C. The resulting mixture was removed from the glovebox, cooled to room temperature, and precipitated from isopropanol to remove the excess PDMS. Significant material was lost during the transfer and precipitation due to its soft nature. 0.991 g was isolated and $^1$H-NMR indicated that the reaction had reached 95% conversion by disappearance of the SiH peak. Assuming that the 81.5% functionalized polyethylene reacted with polydimethylsiloxane in a statistical manner, this material is calculated to be 56.9% triblock, 41.1% diblock, and 2.0% unreacted polyethylene.

Example 32

To a 250 mL glass jar was add 15.5 g (2.71 mmol, 1 equiv.) of an SiH terminated poly(ethylene-co-octene) (M$_n$ 5731 g/mol by $^1$H-NMR, M$_n$ 4690 g/mol, M$_w$ 12.710 g/mol, PDI 2.71, 12.8 mol % octene by GPC) and brought into a nitrogen filled glovebox. Then, 5.46 g (1.08 mmol, 0.4 equiv.) of divinyl PDMS (Gelest DMS-V21, M$_n$ 5038 by NMR) was weighed directly on top of this polyolefin. 125 mL of toluene was added the jar and heated to 110° C. to dissolve. Then, 18.5 mg of PtMe$_2$COD (2 mol %) was added to the jar as a solid, and the clear colorless solution was stirred overnight.

After 15 hours, an aliquot was removed for $^1$H-NMR. Based on the stoichiometry of the polyolefin and silicone and integrating the main aliphatic peak to the known value from the starting material, a conversion of approximately 98% was calculated. No vinyl or SiH groups could be detected by NMR.

The reaction was cooled until warm to the touch and dumped into a steel pan to dry over the weekend. 20.4 g of product was collected. High temperature liquid chromatography analysis showed that the sample contained <1.5 wt % silicone, consistent with the $^1$H-NMR data. 65.1% polyolefin in triblock.

Example 33

To a 250 mL jar was added 9.1 g (0.608 mmol, 1 equiv.) of an SiH-terminated poly(ethylene-co-octene) (M$_n$ 14978 g/mol by $^1$H-NMR, M$_n$: 14246 g/mol, M$_w$: 32784, 15.2 mol % octene by GPC) and brought into a nitrogen filled glovebox. Then, 4.16 g (0.24 mmol, 0.4 quiv.) of divinyl PDMS (DMS-V31, Gelest, M$_n$ 17135 g/mol by NMR) was weighed directly on top of this polyolefin. 160 mL of toluene was added to the jar and heated to 90° C. to dissolve. Then, 0.81 mL (2 mol %) of a 5 mg/mL solution of PtMe$_2$COD catalyst in toluene was added to the reaction and the jar was allowed to stir overnight at 90° C.

After 18 hours, an aliquot was removed and dried out for NMR. $^1$H-NMR indicated that there was no more SiH that could be observed. Based on the stoichiometry of the polyolefin and silicone and integrating the main aliphatic peak to the known value from the starting material, a conversion of approximately 64% was calculated. 0.29 protons corresponding to vinyl groups could be observed.

Then, the reaction was cooled until warm to the touch and removed from the glovebox. The jar was then poured out into a metal pan and allowed to dry in a hood. Then, the pan was placed in a vacuum oven and dried overnight at 55° C. 12.76 g of total material was isolated. High temperature liquid chromatography showed that the sample was approximately 7.4 wt % free PDMS, or approximately 37.2% triblock and 47.6% diblock copolymer. 63.6% polyolefin in triblock.

INDUSTRIAL APPLICABILITY

An important distinguishing feature of the method described herein is that an Si—H functional group resides on the polyolefin, which allows hydrosilylation reaction with a silicon bonded group having terminal aliphatic unsaturation at the terminus of a polyorganosiloxane, which is unable to undergo a deleterious isomerization reaction and enables higher conversions than previous systems in which a polyolefin having terminal aliphatic unsaturation (not a silyl group) was reacted with an polyorganosiloxane having SiH functionality. Production of block copolymers by the method described herein is indicated by the Si—C—C—Si (red) linkage shown in the exemplary schemes below.

i. Synthesis of Ab Block Copolymers

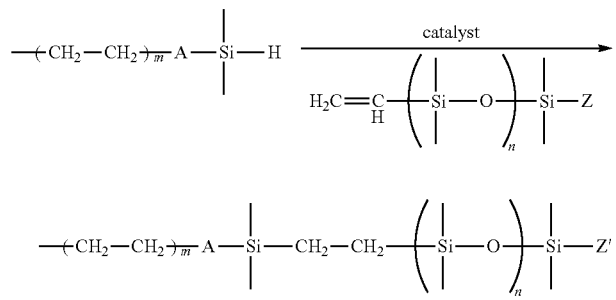

ii. SYNTHESIS OF ABA BLOCK COPOLYMERS

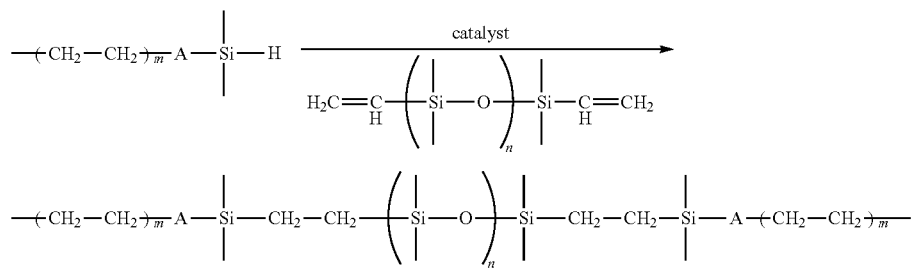

ii. SYNTHESIS OF BAB BLOCK COPOLYMERS

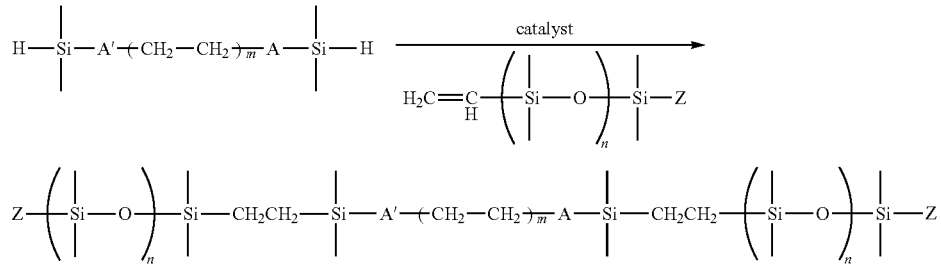

ii. SYNTHESIS OF (AB)$_n$ BLOCK COPOLYMERS

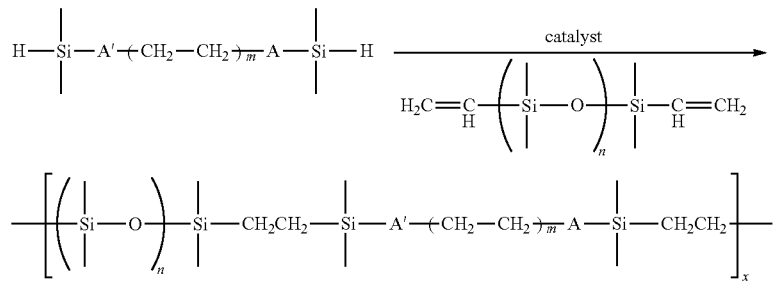

The exemplary schemes above show the synthesis of polyethylene-block-polydimethylsiloxanes by coupling via hydrosilylation with vinyl terminated polydimethylsiloxanes.

Definitions and Usage of Terms

All amounts, ratios, and percentages are by weight unless otherwise indicated by the context of the specification. The amounts of all starting materials in a composition total 100% by weight. The Brief Summary of the Invention and the Abstract are hereby incorporated by reference. The articles 'a', 'an', and 'the' each refer to one or more, unless otherwise indicated by the context of specification. The disclosure of ranges includes the range itself and also anything subsumed therein, as well as endpoints. For example, disclosure of a range of 1 to 20 includes not only the range of 1 to 20 including endpoints, but also 1, 2, 3, 4, 6, 10, and 20 individually, as well as any other number subsumed in the range. Furthermore, disclosure of a range of, for example, 1 to 20 includes the subsets of, for example, 1 to 3, 2 to 6, 10 to 20, and 2 to 10, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup hydrogen, alkyl and aryl; the subgroup hydrogen and alkyl; and any other individual member and subgroup subsumed therein.

"Periodic Table of the Elements" refers to the Periodic Table of the Elements published in the CRC Handbook of Chemistry and Physics, 68th Edition, by CRC Press, Inc., 1987. Any reference to a Group or Groups means the Group or Groups reflected in this Periodic Table of the Elements using the IUPAC system for numbering groups.

The term "comprise" and derivatives thereof (e.g., comprising, comprises) means including and is not intended to exclude the presence of any additional component, starting material, step or procedure, whether or not the same is expressly recited herein.

The term "hydrocarbyl" means groups containing only hydrogen and carbon atoms, including branched or unbranched, saturated or unsaturated, cyclic or noncyclic groups. Monovalent hydrocarbyl groups include alkyl including cycloalkyl, alkenyl, alkadienyl, cycloalkenyl, cycloalkadienyl, aryl, and alkynyl groups.

The term "telechelic" refers to a reactive polymer and means that the reactive polymer possesses reactive functional groups at the chain ends, where the polymer chain ends may have either the same or different reactive functional groups. As used herein, either one, both, or neither of A) the silyl terminated polyolefin and B) the polydiorganosiloxane may be telechelic.

The following abbreviations are used throughout the specification.

TABLE X

| Abbreviation | Definition |
|---|---|
| ° C. | Degrees Celsius |
| Da | Daltons or g/mol |
| DMAP | 4-(dimethylamino) pyridine |
| DMF | N,N-dimethylformamide |
| DMPU | 1,3-dimethyl-3,4,5,6-tetrahydro-2-pyrimidinone |
| DP | degree of polymerization |
| Et | ethyl |
| FW | formula weight |

TABLE X-continued

| Abbreviation | Definition |
|---|---|
| g | gram |
| GPC | gel permeation chromatography, which can be measured as described in Reference Example 1 |
| hr | hour |
| IR | infra-red |
| L | liter |
| Me | methyl |
| mg | milligram |
| min | minute |
| mL | Milliliter |
| mmol | millimole |
| Mn | number average molecular weight (Da). Mn for polydiorganosiloxanes may be measured by size exclusion chromatography (commercial GPC technique) Mn of silyl terminated polyolefins and of the polyolefin - polydiorganosiloxane block copolymers produced herein may be measured by the method of Reference Example 1, described above. |
| mol | mole |
| Mw | Weight average molecular weight as measured by size exclusion chromatography (commercial technique gel permeation chromatography (GPC) |
| NMI | N-methyl imidazole |
| NMR | Nuclear magnetic resonance |
| PDI | polydispersity index |
| PDMS | polydimethylsiloxane |
| PE | polyethylene |
| Ph | phenyl |
| ppm | parts per million by weight |
| PtMe$_2$COD | (1,5-Cyclooctadiene)dimethylplatinum(II) (CAS Number 12266-92-1) |
| RT | Room temperature of 20° C. to 25° C. |
| TMAF | Tetramethylammonium fluoride |
| TMEDA | Tetramethylenediamine |
| µ | micro |
| Vi | Vinyl |

EMBODIMENTS OF THE INVENTION

In a first embodiment, a method for preparing a polyolefin-polydiorganosiloxane block copolymer comprises:
1) combining starting materials comprising
A) a silyl terminated polyolefin having 1 to 2 terminal silyl groups per molecule, where the terminal silyl group has formula

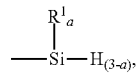

where each $R^1$ is an independently selected monovalent hydrocarbyl group and each subscript a is independently 1 or 2;
B) a polydiorganosiloxane having 1 to 2 terminal silicon bonded terminally aliphatically unsaturated organic groups capable of undergoing hydrosilylation reaction; and
C) a hydrosilylation reaction catalyst.

In a second embodiment, in the method of the first embodiment, A) the silyl terminated polyolefin has unit formula:

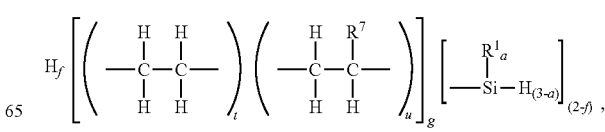

where subscript f is 0 to 1, and subscripts t and u have relative values such that 0<t≤1, 0≤u≤1, subscript g≥1, and each $R^7$ is independently a monovalent hydrocarbyl group of 2 to 20 carbon atoms.

In a third embodiment, in the method of the second embodiment, subscript g is 1 to 500.

In a fourth embodiment, in the method of the third embodiment, subscript g is 10 to 400.

In a fifth embodiment, in the method of the fourth embodiment, subscript g is 18 to 360.

In a sixth embodiment, in the method of any one of the first to fifth embodiments, the silyl terminated polyolefin is silyl terminated polyethylene or silyl terminated poly(ethylene/octene) copolymer.

In a seventh embodiment, in the method of any one of the preceding embodiments, starting material B) comprises a polydiorganosiloxane of formula (B1):

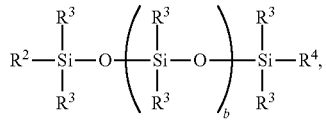

where each $R^2$ is an independently selected monovalent organic group having terminal aliphatic unsaturation, each $R^3$ is independently selected from the group consisting of a hydrogen atom and a monovalent organic group free of terminal aliphatic unsaturation, each $R^4$ is independently selected from $R^2$ and $R^3$, and subscript b≥0.

In an eighth embodiment, in the method of the seventh embodiment, each $R^2$ is an alkenyl group, alternatively a vinyl group.

In a ninth embodiment, in the method of the seventh or eighth embodiment, each $R^3$ is selected from alkyl and aryl, alternatively methyl and phenyl.

In a tenth embodiment, in the method of the seventh or eighth embodiment, subscript b is 2 to 2,000.

In an eleventh embodiment, in the method of any one of the first through the tenth embodiments, any one of conditions A) to D) is met, where:

Condition A) is that the silyl terminated polyolefin has one terminal silyl group per molecule, Condition B) is that the silyl terminated polyolefin has two terminal silyl groups per molecule, Condition C) is that the polyorganosiloxane has one terminal organic group having terminal aliphatic unsaturation per molecule, and.

Condition D) is that the polyorganosiloxane has two terminal organic groups having terminal aliphatic unsaturation per molecule.

In a twelfth embodiment, in the method of the eleventh embodiment, any one of conditions E) to I) is met, where Condition E) means both condition A) and condition C),
Condition F) means both condition A) and condition D),
Condition G) means both condition B) and condition C),
Condition H) means all three of A), B), and D), and
Condition I) means all three of B), C), and D).

When condition H) is met, both a silyl terminated polyolefin having one terminal silyl group per molecule and a silyl terminated polyolefin having two terminal silyl groups per molecule are used. The resulting copolymer in this embodiment may have $(AB)_n$ architecture. When Condition I) is met, both a polyorganosiloxane having one terminal organic group having terminal aliphatic unsaturation per molecule and a polyorganosiloxane has two terminal organic groups having terminal aliphatic unsaturation per molecule are used. The resulting copolymer in this embodiment may have $(AB)_n$ architecture. Alternatively, when any one of conditions D), H), and I) is met, then an alkoxysilyl-functional organosilicon compound having at least one silicon bonded hydrogen atom may be included in the starting materials, and an alkoxy functional polyolefin-polydiorganosiloxane may be synthesized.

In a thirteenth embodiment, in any one of the first through twelfth embodiments, the starting materials further comprise one or more additional starting materials selected from the group consisting of D) a solvent, E) a hydrosilylation reaction inhibitor, F) an alkoxysilyl-functional organosilicon compound having at least one silicon bonded hydrogen atom, and a combination of two or more of D), E), and F).

In a fourteenth embodiment, a polyolefin-polydiorganosiloxane block copolymer comprises unit formula (I):

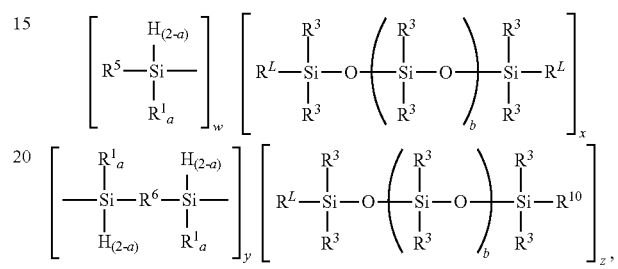

where each $R^L$ is an independently selected divalent hydrocarbyl group, each $R^1$ is an independently selected monovalent hydrocarbyl group, each $R^3$ is independently selected from a hydrogen atom and a monovalent hydrocarbyl group free of terminal aliphatic unsaturation, each $R^5$ is an independently selected hydrogen terminated polyolefinic block, each $R^6$ is an independently selected divalent polyolefinic block, each $R^{10}$ is independently selected from $R^3$ and an alkoxysilyl functional hydrocarbylene containing group, each subscript a is independently 1 or 2, each subscript b is independently 0 or a positive number; subscript w is 0 to 2, subscript x≥0, subscript y≥0, subscript z is 0 to 2, a quantity (w+y)≥1, a quantity (x+z)≥1, with the provisos that when subscript w=0, subscript z is >0, and when subscript z=0, subscript w>0.

In a fifteenth embodiment, a polyolefin-polydiorganosiloxane block copolymer has formula (IV):

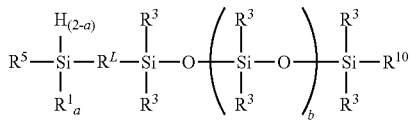

where each $R^L$ is an independently selected divalent hydrocarbyl group, each $R^1$ is an independently selected monovalent hydrocarbyl group, each $R^3$ is independently selected from a hydrogen atom and a monovalent hydrocarbyl group free of terminal aliphatic unsaturation, each $R^5$ is an independently selected hydrogen terminated polyolefinic block, each $R^{10}$ is independently selected from $R^3$ and an alkoxysilyl functional hydrocarbylene containing group, each subscript a is independently 1 or 2, and subscript b≥0.

In a sixteenth embodiment, in the copolymer of formula (IV) in the fifteenth embodiment, each $R^L$ is —$C_2H_4$—, each $R^1$ is methyl, each $R^3$ is methyl, each $R^5$ is selected from hydrogen terminated polyethylene and hydrogen terminated poly(ethylene/octene), each $R^6$ is selected from polyethylene and poly(ethylene/octene), each subscript a=1, and each subscript b is 2 to 2,000.

In a seventeenth embodiment, a polyolefin-polydiorganosiloxane block copolymer has formula (V):

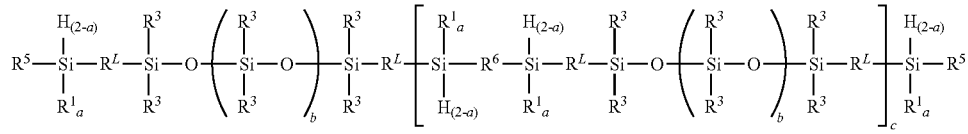

where each $R^L$ is an independently selected divalent hydrocarbyl group, each $R^1$ is an independently selected monovalent hydrocarbyl group, each $R^3$ is independently selected from a hydrogen atom and a monovalent hydrocarbyl group free of terminal aliphatic unsaturation, each $R^5$ is an independently selected hydrogen terminated polyolefinic block, each $R^6$ is an independently selected divalent polyolefinic block, each subscript a is independently 1 or 2, each subscript b≥0, and subscript c is 1 to 1,000.

In an eighteenth embodiment, in the copolymer of formula (V) in the seventeenth embodiment, each $R^L$ is —$C_2H_4$—, each $R^1$ is methyl, each $R^3$ is methyl, each $R^5$ is selected from hydrogen terminated polyethylene and hydrogen terminated poly(ethylene/octene), each $R^6$ is selected from polyethylene and poly(ethylene/octene), each subscript a=1, each subscript b is 2 to 2,000, and subscript c is 1 to 100.

In a nineteenth embodiment, a polyolefin-polydiorganosiloxane block copolymer has formula (VI):

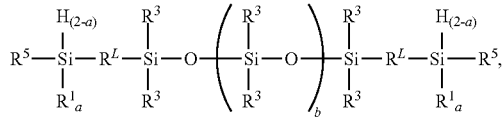

where each $R^L$ is an independently selected divalent hydrocarbyl group, each $R^1$ is an independently selected monovalent hydrocarbyl group, each $R^3$ is independently selected from a hydrogen atom and a monovalent hydrocarbyl group free of terminal aliphatic unsaturation, each $R^5$ is an independently selected hydrogen terminated polyolefinic block, each $R^6$ is an independently selected divalent polyolefinic block, each subscript a is independently 1 or 2, and subscript b 0.

In a twentieth embodiment, in the copolymer of formula (VI) in the nineteenth embodiment, each $R^L$ is —$CH_2$—, each $R^1$ is methyl, each $R^3$ is methyl, each $R^5$ is selected from hydrogen terminated polyethylene and hydrogen terminated poly(ethylene/octene), each subscript a=1, and each subscript b is 2 to 2,000.

In a twenty first embodiment, a polyolefin-polydiorganosiloxane block copolymer has formula (VII):

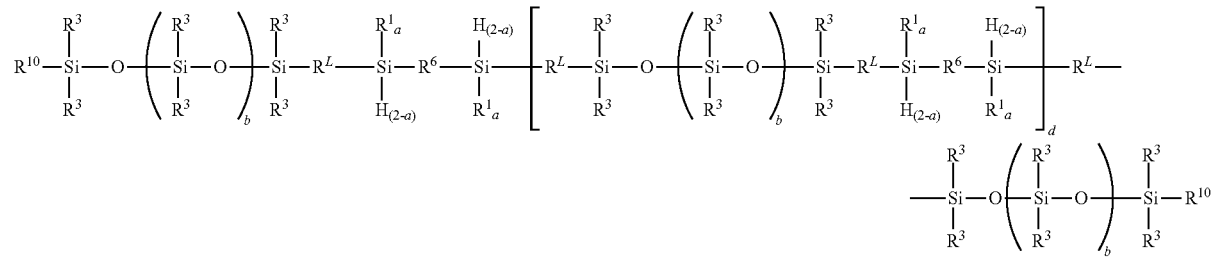

where each $R^L$ is an independently selected divalent hydrocarbyl group, each $R^1$ is an independently selected monovalent hydrocarbyl group, each $R^3$ is independently selected from a hydrogen atom and a monovalent hydrocarbyl group free of terminal aliphatic unsaturation, each $R^5$ is an independently selected hydrogen terminated polyolefinic block, each $R^6$ is an independently selected divalent polyolefinic block, each $R^{10}$ is independently selected from $R^3$ and an alkoxysilyl functional hydrocarbylene containing group, each subscript a is independently 1 or 2, each subscript b≥0, and subscript d is 1 to 1,000.

In a twenty second embodiment, in the copolymer of formula (VII) in the twenty first embodiment, each $R^L$ is —$C_2H_4$—, each $R^1$ is methyl, each $R^3$ is methyl, each $R^5$ is selected from hydrogen terminated polyethylene and hydrogen terminated poly(ethylene/octene), each $R^6$ is selected from polyethylene and poly(ethylene/octene), each subscript a=1, each subscript b is 2 to 2,000, and subscript d is 1 to 100.

In a twenty third embodiment, a polyolefin-polydiorganosiloxane block copolymer has formula (VIII):

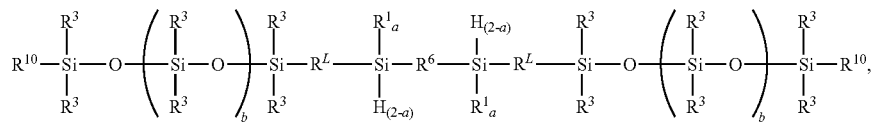

where each $R^L$ is an independently selected divalent hydrocarbyl group, each $R^1$ is an independently selected monovalent hydrocarbyl group, each $R^3$ is independently selected from a hydrogen atom and a monovalent hydrocarbyl group free of terminal aliphatic unsaturation, each $R^5$ is an independently selected hydrogen terminated polyolefinic block, each $R^6$ is an independently selected divalent polyolefinic block, each $R^{10}$ is independently selected from $R^3$ and an alkoxysilyl functional hydrocarbylene containing group, each subscript a is independently 1 or 2, and each subscript $b \geq 0$.

In a twenty fourth embodiment, in the copolymer of formula (VIII) in the twenty third embodiment, each $R^L$ is —$C_2H_4$—, each $R^1$ is methyl, each $R^3$ is methyl, each $R^6$ is selected from polyethylene and poly(ethylene/octene), each subscript a=1, and each subscript b is 2 to 2,000.

In a twenty fifth embodiment, the silyl terminated polyolefin used to prepare the polyolefin-polydiorganosiloxane block copolymer in any of the preceding embodiments is prepared by a method comprising:
1) combining starting materials comprising
   a) a polymeryl-metal,
   b) a nitrogen containing heterocycle, and
   c) a halosilane, and
   optionally d) a solvent; thereby forming a product comprising the silyl-terminated polyolefin;
2) washing the product with water, thereby removing unwanted materials comprising starting material b); and
3) recovering the silyl terminated polyolefin.

The invention claimed is:
1. A polyolefin polydiorganosiloxane block copolymer comprising unit formula:

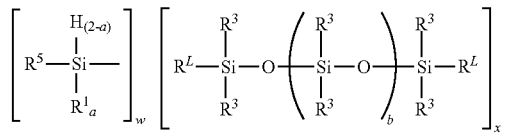

where each $R^L$ is an independently selected alkylene group, each $R^1$ is an independently selected monovalent hydrocarbyl group, each $R^3$ is independently selected from a hydrogen atom and a monovalent hydrocarbyl group free of terminal aliphatic unsaturation, each $R^5$ is an independently selected hydrogen terminated polyolefinic block, each $R^6$ is an independently selected divalent polyolefinic block, each $R^{10}$ is independently selected from $R^3$ and an alkoxysilyl functional hydrocarbylene containing group, each subscript a is independently 1 or 2, each subscript b is independently 0 or a positive number; subscript w is 0 to 2, subscript x is 0 or a positive number, subscript y is 0 or a positive number, subscript z is 0 to 2, a quantity (w+y)≥1, a quantity (x+z)≥1, with the provisos that when subscript w=0, subscript z is >0 and when subscript z=0, subscript w>0.

2. The copolymer of claim 1, where subscript w=1, subscript x=0, subscript y=0, and subscript z=1, and the copolymer has formula (IV):

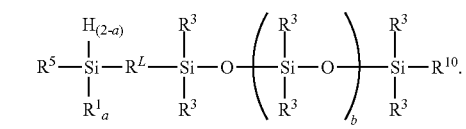

3. The copolymer of claim 1, where subscript w=2, subscript z=0, subscript x≥1, subscript y≥0, and the copolymer has formula (V):

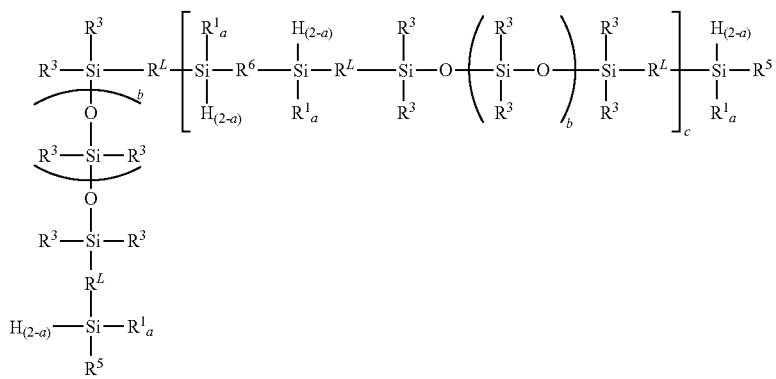

-continued

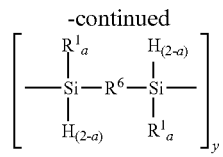

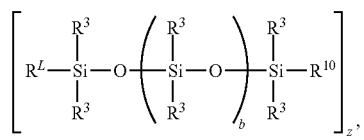

where subscript c≥0.

4. The copolymer of claim 1, where subscript w=2, subscript x=1, subscript y=0 subscript z=0, and subscript c=0, and the copolymer has formula (VI):

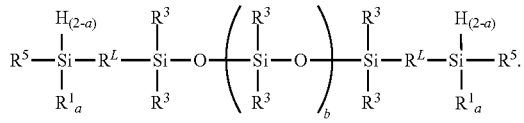

5. The copolymer of claim 1, where subscript z=2, subscript w=0, subscript x≥0, and subscript y≥1, and the copolymer has formula (VII):

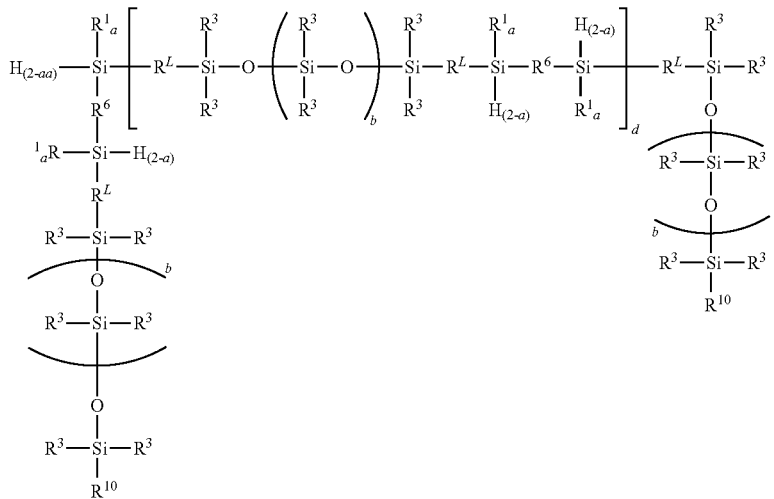

where subscript d≥0.

6. The copolymer of claim 1, where subscript w=0, subscript x=1, subscript y=0 and subscript z=2, subscript d=0, and the copolymer has formula (VIII):

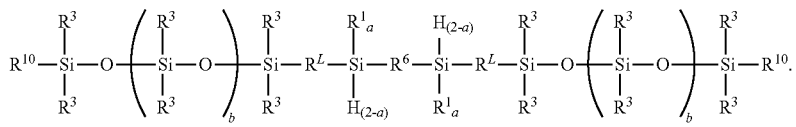

7. The copolymer of claim 1, where (i) each $R^5$ has unit formula $H[(CH_2CH_2)_t(CHR^7CH_2)_u]_g$, (ii) each $R^6$ has unit formula $[(CH_2CH_2)_t(CHR^7CH_2)_u]_g$; or (iii) both (i) and (ii), where subscripts t and u have relative values such that $0<t\le1, 0\le u\le1$, subscript $g\ge1$, and each $R^7$ is an independently selected monovalent hydrocarbyl group of 1 to 20 carbon atoms.

8. The copolymer of claim 7, where each $R^7$ is a hexyl group.

9. The copolymer of claim 1, where each $R^1$ is methyl, each $R^3$ is methyl, and each $R^L$ is selected from $-C_2H_4-$ and $-C_3H_6-$.

10. The copolymer of claim 1, where at least one instance of $R^{10}$ represents an alkoxysilyl functional hydrocarbylene containing group with a formula selected from:

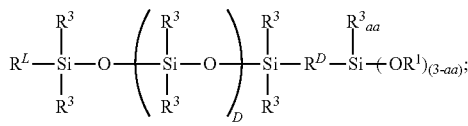

-continued

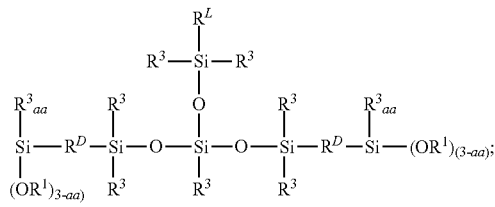

one or both of

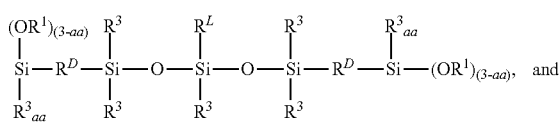, and

-continued

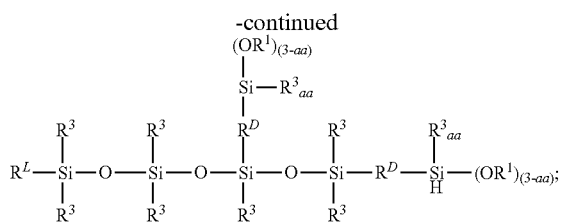

and $(R^3{}_2SiO_{2/2})_E(R^3R^LSiO_{2/2})_F$

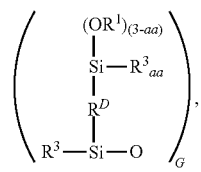

where each $R^D$ is independently a divalent hydrocarbyl group of 2 to 18 carbon atoms; each subscript aa is independently 0, 1, or 2, alternatively 0 or 1; subscript D is 0 to 20, alternatively 1 to 10; E is 0 or more, subscript F is 1 or more, and subscript G is 1 or more and $4 \leq (E+F+G) \leq 50$.

11. The copolymer of claim 4, where each $R^L$ is $-C_2H_4-$, each $R^3$ is methyl, each subscript a=2, each $R^1$ is methyl, and each $R^5$ is a hydrogen terminated ethylene polymeric block.

12. A method for preparing a polyolefin-polydiorganosiloxane block copolymer comprising unit formula:

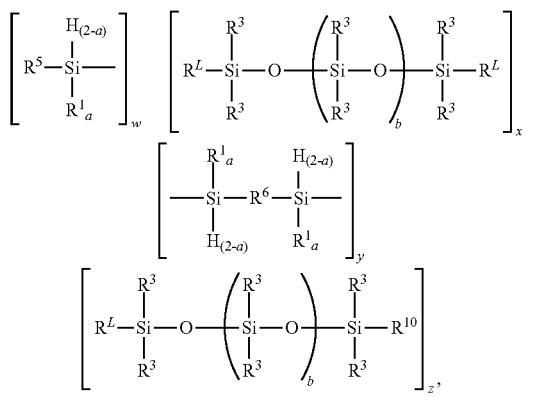

where each $R^L$ is an independently selected alkylene group, each $R^1$ is an independently selected monovalent hydrocarbyl group, each $R^3$ is independently selected from a hydrogen atom and a monovalent hydrocarbyl group free of terminal aliphatic unsaturation, each $R^5$ is an independently selected hydrogen terminated polyolefinic block, each $R^6$ is an independently selected divalent polyolefinic block, each $R^{10}$ is independently selected from $R^3$ and an alkoxysilyl functional hydrocarbylene containing group, each subscript a is independently 1 or 2, each subscript b is independently 0 or a positive number; subscript w is 0 to 2, subscript x is 0 or a positive number, subscript y is 0 or a positive number, subscript z is 0 to 2, a quantity (w+y)≥1, a quantity (x+z)≥1, with the provisos that when subscript w=0, subscript z is >0 and when subscript z=0, subscript w>0, where the method comprises:

optionally pre-1) preparing a silyl terminated polyolefin having 1 to 2 terminal silyl groups per molecule, where the terminal silyl group has formula

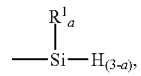

where each $R^1$ is an independently selected monovalent hydrocarbyl group and each subscript a is independently 1 or 2 by a process comprising
  i) combining starting materials comprising
     a) a polymeryl-metal,
     optionally b) a nitrogen containing heterocycle, and
     c) a halosilane, and
     optionally d) a solvent; thereby forming a product comprising the silyl-terminated polyolefin;
  optionally ii) washing the product with water, thereby removing unwanted materials comprising starting material b); and
  optionally iii) recovering the silyl terminated polyolefin; and
1) combining starting materials comprising
  A) the silyl terminated polyolefin;
  B) a substantially linear, alternatively linear, polydiorganosiloxane having 1 to 2 terminal silicon bonded terminally aliphatically unsaturated organic groups capable of undergoing hydrosilylation reaction;
  C) a hydrosilylation reaction catalyst;
  optionally D) a solvent;
  optionally E) a hydrosilylation reaction inhibitor; and
  optionally F) an alkoxysilyl-functional organosilicon compound having at least one silicon bonded hydrogen atom.

13. The method of claim 12, where A) the silyl terminated polyolefin has unit formula (A1):

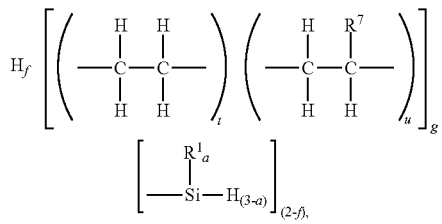

where subscript f is 0 to 1, and subscripts t and u have relative values such that $0<t\leq1$, $0\leq u\leq1$, subscript g≥1, and each $R^7$ is independently a monovalent hydrocarbyl group of 2 to 20 carbon atoms.

14. The method of claim 12, where Starting material B) comprises a polydiorganosiloxane of formula (B1):

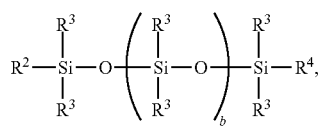

where each $R^2$ is an independently selected organic group having terminal aliphatic unsaturation, each $R^3$ is independently selected from the group consisting of a hydrogen atom and a monovalent organic group free of terminal aliphatic unsaturation, each $R^4$ is independently selected from $R^2$ and $R^3$, and subscript $b \geq 0$.

15. The method of claim 12, where any one of conditions A) to D) is met, where:
    Condition A) is that the silyl terminated polyolefin has one terminal silyl group per molecule,
    Condition B) is that the silyl terminated polyolefin has two terminal silyl groups per molecule,
    Condition C) is that the polyorganosiloxane has one terminal organic group having terminal aliphatic unsaturation per molecule, and
    Condition D) is that the polyorganosiloxane has two terminal organic groups having terminal aliphatic unsaturation per molecule.

16. The method of claim 15, where one of conditions E) to I) is met, where
    Condition E) means both condition A) and condition C),
    Condition F) means both condition A) and condition D),
    Condition G) means both condition B) and condition C),
    Condition H) means all three of A), B), and D), and
    Condition I) means all three of B), C), and D).

17. The method of claim 13, where Starting material B) comprises a polydiorganosiloxane of formula (B1):

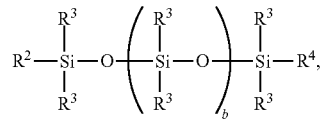

where each $R^2$ is an independently selected organic group having terminal aliphatic unsaturation, each $R^3$ is independently selected from the group consisting of a hydrogen atom and a monovalent organic group free of terminal aliphatic unsaturation, each $R^4$ is independently selected from $R^2$ and $R^3$, and subscript $b \geq 0$.

18. The method of claim 13, where any one of conditions A) to D) is met, where:
    Condition A) is that the silyl terminated polyolefin has one terminal silyl group per molecule,
    Condition B) is that the silyl terminated polyolefin has two terminal silyl groups per molecule,
    Condition C) is that the polyorganosiloxane has one terminal organic group having terminal aliphatic unsaturation per molecule, and
    Condition D) is that the polyorganosiloxane has two terminal organic groups having terminal aliphatic unsaturation per molecule.

19. The method of claim 14, where any one of conditions A) to D) is met, where:
    Condition A) is that the silyl terminated polyolefin has one terminal silyl group per molecule,
    Condition B) is that the silyl terminated polyolefin has two terminal silyl groups per molecule,
    Condition C) is that the polyorganosiloxane has one terminal organic group having terminal aliphatic unsaturation per molecule, and
    Condition D) is that the polyorganosiloxane has two terminal organic groups having terminal aliphatic unsaturation per molecule.

\* \* \* \* \*